(12) United States Patent
Dyer

(10) Patent No.: US 12,741,256 B2
(45) Date of Patent: Sep. 22, 2026

(54) CHEMICAL DISPENSER HAVING A MOTORIZED ROTARY DIVERTER VALVE AND METHOD OF USING SAME

(71) Applicant: Delaware Capital Formation, Inc., Wilmington, DE (US)

(72) Inventor: Christopher J. Dyer, South Warnborough (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 19/020,933

(22) Filed: Jan. 14, 2025

(65) Prior Publication Data

US 2025/0153123 A1 May 15, 2025

Related U.S. Application Data

(63) Continuation of application No. 16/993,332, filed on Aug. 14, 2020, now Pat. No. 12,214,326.
(Continued)

(51) Int. Cl.
*B01F 35/75* (2022.01)
*A47L 15/44* (2006.01)
(Continued)

(52) U.S. Cl.
CPC .......... *B01F 35/7547* (2022.01); *B01F 23/49* (2022.01); *B01F 25/31232* (2022.01);
(Continued)

(58) Field of Classification Search
CPC .............. B01F 35/7547; B01F 35/7549; B01F 25/31232; B01F 23/49; D06F 39/022; F16K 11/074; F16K 11/0746
See application file for complete search history.

(56) References Cited

U.S. PATENT DOCUMENTS 3,542,071 A 11/1970 Lightner et al.
5,682,930 A 11/1997 Crossdale
(Continued)

FOREIGN PATENT DOCUMENTS

WO WO 2006125191 A2 11/2006

OTHER PUBLICATIONS

Extended European Search Report in European Appln. No. 20191693.9, dated Feb. 21, 2021.
Examination Report in European Appln. No. 20191693.9, dated Jun. 29, 2022.

*Primary Examiner* — Daphne M Barry
(74) *Attorney, Agent, or Firm* — Fish & Richardson P.C.

(57) ABSTRACT

A chemical dispenser for a chemical dispensing system is disclosed. The chemical dispenser includes an input selector valve having an opened position and a closed position and configured to be coupled to a diluent source, a diverter valve coupled to the input selector valve, and a plurality of eductors coupled to the diverter valve. The diverter valve includes a valve head having a diluent port, a valve seat having a plurality of eductor ports, wherein each eductor port is in communication with a respective one of the plurality of eductors, and a drive mechanism coupled to the valve head and configured to move the valve head relative to the valve seat. The valve head may include one or more pressure relief ports for equalizing the diluent pressure across the valve head. A chemical dispensing system including the chemical dispenser and a method of using the chemical dispenser are also disclosed.

20 Claims, 18 Drawing Sheets

Related U.S. Application Data

(60) Provisional application No. 62/888,568, filed on Aug. 19, 2019.

(51) Int. Cl.

| | |
|---|---|
| ***B01F 23/40*** | (2022.01) |
| ***B01F 25/312*** | (2022.01) |
| ***D06F 39/02*** | (2006.01) |
| ***F16K 11/074*** | (2006.01) |

(52) U.S. Cl.

CPC ........ *B01F 35/7549* (2022.01); *D06F 39/022* (2013.01); *F16K 11/074* (2013.01); *A47L 15/4418* (2013.01)

(56) References Cited

U.S. PATENT DOCUMENTS

| | | | |
|---|---|---|---|
| 6,499,872 | B2 | 12/2002 | Sand |
| 8,555,679 | B2 | 10/2013 | Schulze |
| 10,780,470 | B2 | 9/2020 | Saier et al. |
| 11,813,647 | B2 | 11/2023 | Saier et al. |
| 2003/0056842 | A1 | 3/2003 | Sand et al. |
| 2006/0260704 | A1 | 11/2006 | Sand |
| 2008/0235880 | A1 | 10/2008 | Kim et al. |
| 2010/0006123 | A1 | 1/2010 | Simpson et al. |
| 2010/0024915 | A1 | 2/2010 | Thomas et al. |
| 2012/0247158 | A1 | 10/2012 | Ditze et al. |
| 2013/0036772 | A1 | 2/2013 | Brueckner et al. |
| 2013/0036775 | A1 | 2/2013 | Brueckner et al. |
| 2013/0092704 | A1 | 4/2013 | Tincher et al. |
| 2021/0053018 | A1 | 2/2021 | Dyer |

CHEMICAL DISPENSER HAVING A MOTORIZED ROTARY DIVERTER VALVE AND METHOD OF USING SAME

CROSS-REFERENCE TO RELATED APPLICATIONS

This application is a continuation of U.S. application Ser. No. 16/993,332 filed Aug. 14, 2020, which claims the benefit of and priority to U.S. Provisional Application No. 62/888,568 filed Aug. 19, 2019, the disclosure of which are incorporated by reference herein in their entirety.

TECHNICAL FIELD

This invention generally relates to an improved chemical dispenser for a chemical dispensing system, and more particularly to a chemical dispenser having a motorized rotary diverter valve for diverting diluent to one of a plurality of eductors in the dispenser, and to a method of using the motorized rotary diverter valve to dispense chemical solutions.

BACKGROUND

The dispensing of liquid chemical products from one or more chemical receptacles is a common requirement of many industries, such as the laundry, textile, warewash, healthcare, janitorial services and food processing industries. In an industrial laundry facility, for example, one of several operating washing machines will require, from time to time, aqueous solutions containing quantities of alkaloid, detergent, bleach, starch, softener and/or sour. By way of further example, janitorial applications require aqueous solutions with various chemical agents for cleaning and sanitizing purposes. Chemical dispensing systems have been developed to deliver chemical products or chemical solutions for a wide range of industrial applications.

Many chemical dispensing systems used in industrial applications rely on eductors for drawing chemical products into a diluent stream to produce a desired chemical solution. Eductors are devices that pass a liquid through a choke to generate the Venturi effect. The suction generated by the Venturi effect is used to draw another liquid into the eductor. For example, water running through the eductor may cause a chemical product to be drawn into the eductor, where it mixes with the water and is subsequently discharged as a dilute chemical solution. Eductors are considered attractive because they do not require external power to mix the chemical products with a diluent source (in contrast to, for example, a pump). Instead, the energy of the diluent stream is used to "pump" the chemical product into the diluent stream. Eductors are often used to mix chemical products with water in dispensing systems to produce small batches of chemical solutions for use in industrial applications. These batches of chemical solutions may be discharged into various point-of-use devices for use in a desired manner. By way of example, in laundry applications the chemical solutions may be delivered to a washing machine for use in washing towels, sheets, and other textiles. In janitorial applications, for example, chemical solutions may be discharged into various cleaning receptacles, such as spray bottles or mop buckets.

FIG. 1 illustrates a typical in-line chemical dispenser 10 used in known chemical dispensing systems. The chemical dispenser 10 includes an input manifold 12 operatively coupled to a diluent source (not shown), an output manifold 14 operatively coupled to a point-of-use device (e.g., washing machine, cleaning receptacle, etc.; not shown), and a plurality of eductors 16, 18, 20, 22 extending between the input manifold 12 and the output manifold 14. Each of the eductors 16, 18, 20, 22 includes an inlet port 24 coupled to the input manifold 12 via a selector valve 26. The selector valve 26 generally includes a solenoid 28 for opening and closing the selector valve 26 based on instructions, for example, from a controller (not shown). Each of the eductors 16, 18, 20, 22 also includes a discharge port 30 in fluid communication with the output manifold 14.

The left-most or "upstream" eductor 16 may be configured as a flush eductor that is used to provide diluent from the input manifold 12 to the output manifold 14 without injecting any chemical products into the diluent stream. More particularly, the selector valve 26 associated with the flush eductor 16 may open to place the flush eductor 16 in communication with the input manifold 12 and allow diluent to pass through the eductor 16 and to the output manifold 14 to flush residual chemical solution from the output manifold 14 and any delivery lines extending between the output manifold 14 and the point-of-use device. The chemical eductors 18, 20, 22 include a chemical pick up port 32 disposed between the inlet and discharge ports 24, 30 coupled to respective chemical product reservoirs that hold a supply of chemical products (not shown). Thus, when diluent is directed through the chemical eductors 18, 20, 22, a respective chemical product is drawn into the diluent stream to form a chemical solution. The discharge ports 30 of the chemical eductors 18, 20, 22 may be coupled to the output manifold 14 via a check valve 34 to prevent back flow into the eductors 18, 20, 22. The check valve may be omitted for the flush eductor 16, or may be left in place to allow air to be drawn into the system. Advantageously, this may allow the manifold 14 and delivery line to drain.

In operation, a controller (not shown) may sequentially activate one or more of the selector valves 26 for various periods of time to draw a desired amount of one or more chemical products into the eductors 18, 20, 22 and to the output manifold 14. Once the mixture of chemicals defined by the dispensing application has been dispensed, the controller may open the selector valve 26 associated with the flush eductor 16 to flush the output manifold 14 (and associated delivery lines) with diluent for a period of time sufficient to flush each of the dispensed solutions to the point-of-use device.

While the in-line chemical dispenser 10 described above operates for its intended purpose, manufacturers continually strive to improve chemical dispensers to meet the needs and desires of their customers. In this regard, current chemical dispensers may have some drawbacks which prevent their full acceptance and implementation into the market place. By way of example, in-line chemical dispensers have many components that provide similar functions for the dispenser. Such redundancies are inefficient and increase material and manufacturing costs. In reference to FIG. 1, for example, each educator 16, 18, 20, 22 between the input manifold 12 and the output manifold 14 includes a dedicated selector valve 26 and solenoid 28 for controlling whether the selector valve 26 is opened or closed. This increases the cost of the dispenser 10 and increases the complexity of the controller for operating the dispenser 10, which now has to manage the on/off status of multiple selector valves 26, time for which a particular selector valve 26 remains open, etc. Redundancies in dispenser components exist even in the case when the same diluent is used across each of the eductors 16, 18, 20, 22. Additionally, many current eductor-based chemical dispensers, such as the in-line dispenser 10 described above, are typically large and bulky devices having a relatively large footprint in the industrial facility in which they are installed. Thus, such chemical dispensers are typically not incorporated into the machines in which the chemical products are being dispensed (e.g., washing machine), but are separately mounted in the industrial facility. Such an arrangement may be logistically and aesthetically undesirable to facility managers, maintenance personnel, and the like.

Therefore, there is a need for a chemical dispensing system having an improved chemical dispenser that reduces redundancies in product parts in order to reduce costs and simplify control protocols. There is also a need for an improved chemical dispenser that is more compact and having a reduced footprint in the industrial environment.

SUMMARY

A chemical dispenser for a chemical dispensing system is disclosed. The chemical dispenser includes an input selector valve having an opened position and a closed position and configured to be coupled to a diluent source, a diverter valve coupled to the input selector valve, and a plurality of eductors coupled to the diverter valve. The diverter valve includes a valve head having a diluent port, a valve seat having a plurality of eductor ports, wherein each eductor port is in communication with a respective one of the plurality of eductors, and a drive mechanism coupled to the valve head and configured to move the valve head relative to the valve seat so that diluent may flow through each of the plurality of eductors when the input selector valve is in the opened position and the diluent port of the valve seat is in communication with the eductor port corresponding to the each of the plurality of eductors.

In one embodiment, the diverter valve may be configured as a rotary valve wherein the valve head rotates about an axis of the valve seat. In this embodiment, the drive mechanism may include a drive motor for rotating a drive shaft, a worm gear coupled to the drive shaft, and a drive gear that meshes with the worm gear and is operatively coupled to the valve head for rotating the valve head about is axis. In an alternative embodiment, the diverter valve may be configured as a linear diverted valve wherein the valve head moves linearly along an axis relative to the valve seat.

In accordance with an aspect of the invention, the valve head includes one or more pressure relief ports for equalizing the pressure across the valve head. In this way, the force at which the valve head engages the valve seat is substantially independent of the diluent pressure in the diverter valve. This pressure equalization across the valve head reduces wear on the valve (e.g., its sealing elements) as a result of excessive diluent pressure or fluctuations. In one embodiment, the valve seat may include an inner interstitial region and one or more outer interstitial regions separated by a circumferential and/or radial seal. The valve seat may include one or more stiffening tabs and/or stiffening ribs that in combination with the eductor ports defines the circumferential and radial seals. Accordingly, the pressure relief ports may include one or more inner pressure relief ports for equalizing the pressure across the valve head along the inner interstitial region of the valve seat and one or more outer pressure relief ports for equalizing the pressure across the valve head along the one or more outer interstitial regions of the valve seat. The one or more outer pressure relief ports may be formed along the outer periphery of the valve seat. Alternatively, the outer pressure relief ports may be spaced slightly inwardly away the periphery of the valve seat.

In one embodiment, the plurality of eductors in the chemical dispenser may include at least one chemical eductor and at least one flush eductor. For example, in an exemplary embodiment the chemical dispenser may include four eductors, wherein one eductor is a flush eductor and the remaining three eductors are chemical eductors. In an alternative embodiment, two of the eductors may be flush eductors and two eductors may be chemical eductors.

In another embodiment, a chemical dispensing system may include a controller and a chemical dispenser as described above for dispensing one or more chemical solutions. The controller may be operatively coupled to the input selector valve for opening and closing the valve. Moreover, the controller may be operatively coupled to the diverter valve, and more specifically the drive mechanism of the diverter valve, for moving the valve head in a desired manner or sequence. For example, the controller may control the drive mechanism in accordance with a dispensing program stored in the controller or in a remote system operatively coupled to the controller, such as through a network. The dispensing system may further include one or more chemical reservoirs for supplying chemical products to the chemical dispenser. Moreover, the chemical dispenser may additionally include one or more point-of-use devices coupled to the chemical dispenser for receiving the one or more chemical solutions from the chemical dispenser. The point-of-use device may include a washing machine, such as a laundry machine, or a cleaning receptacle, such as a spray bottle or mop bucket.

In still a further embodiment, a method of dispensing a chemical product includes providing a chemical dispenser as described above; directing diluent through a first eductor of the plurality of eductors; moving the vale head relative to the valve seat; and directing diluent through a second eductor of the plurality of eductors. In an exemplary embodiment, the valve seat may be moved using a drive mechanism. In one embodiment, moving the valve head relative to the valve seat may include rotating the valve head about an axis relative to the valve seat. In another embodiment, moving the valve head relative to the valve seat may include moving the valve head linearly along an axis relative to the valve seat. The method may further include equalizing the pressure of the diluent across the valve head. In one embodiment, this may achieved by providing one or more pressure relief ports through the valve head.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
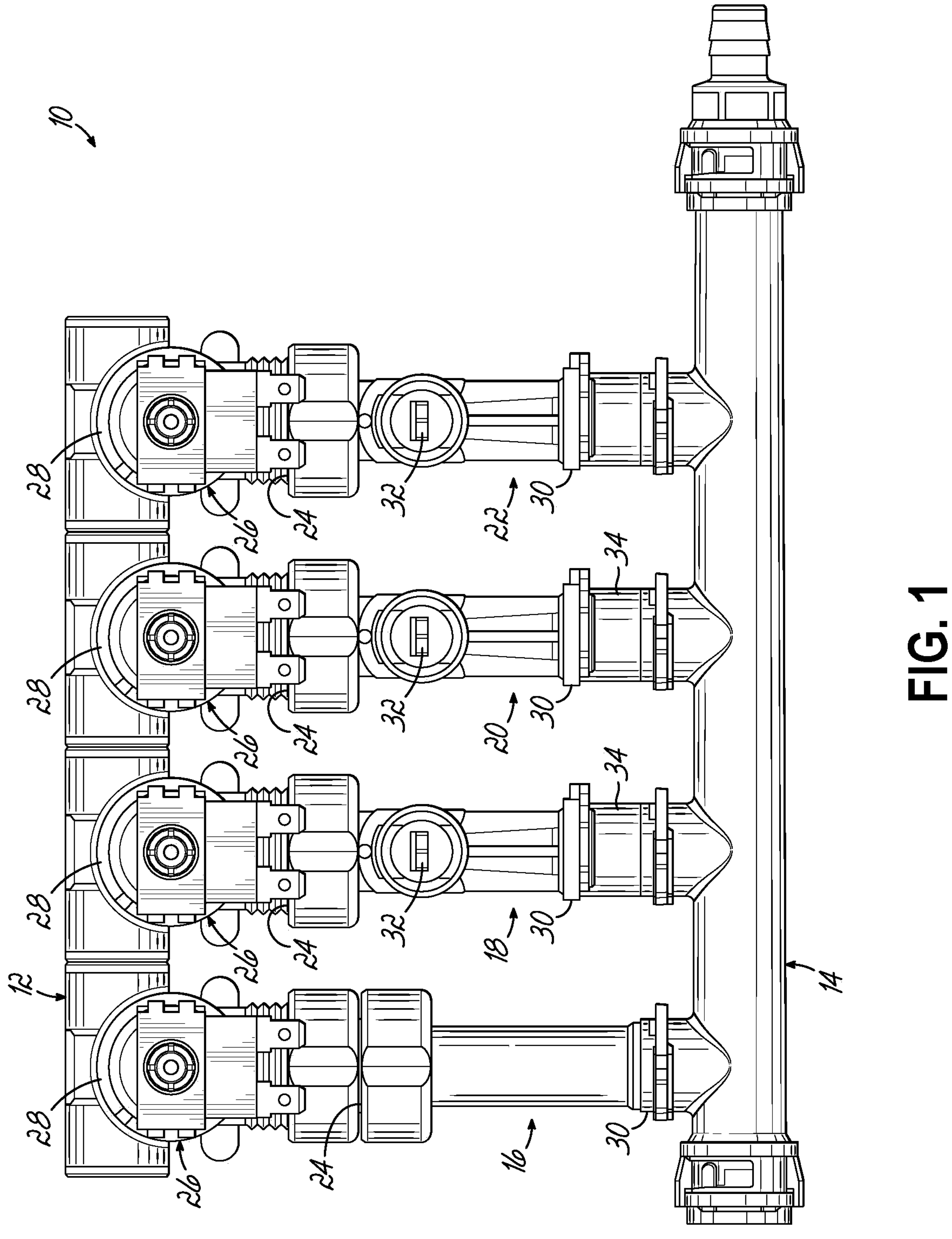
FIG. 1 illustrates an in-line chemical dispenser as generally known in the prior art.
Figure 2:
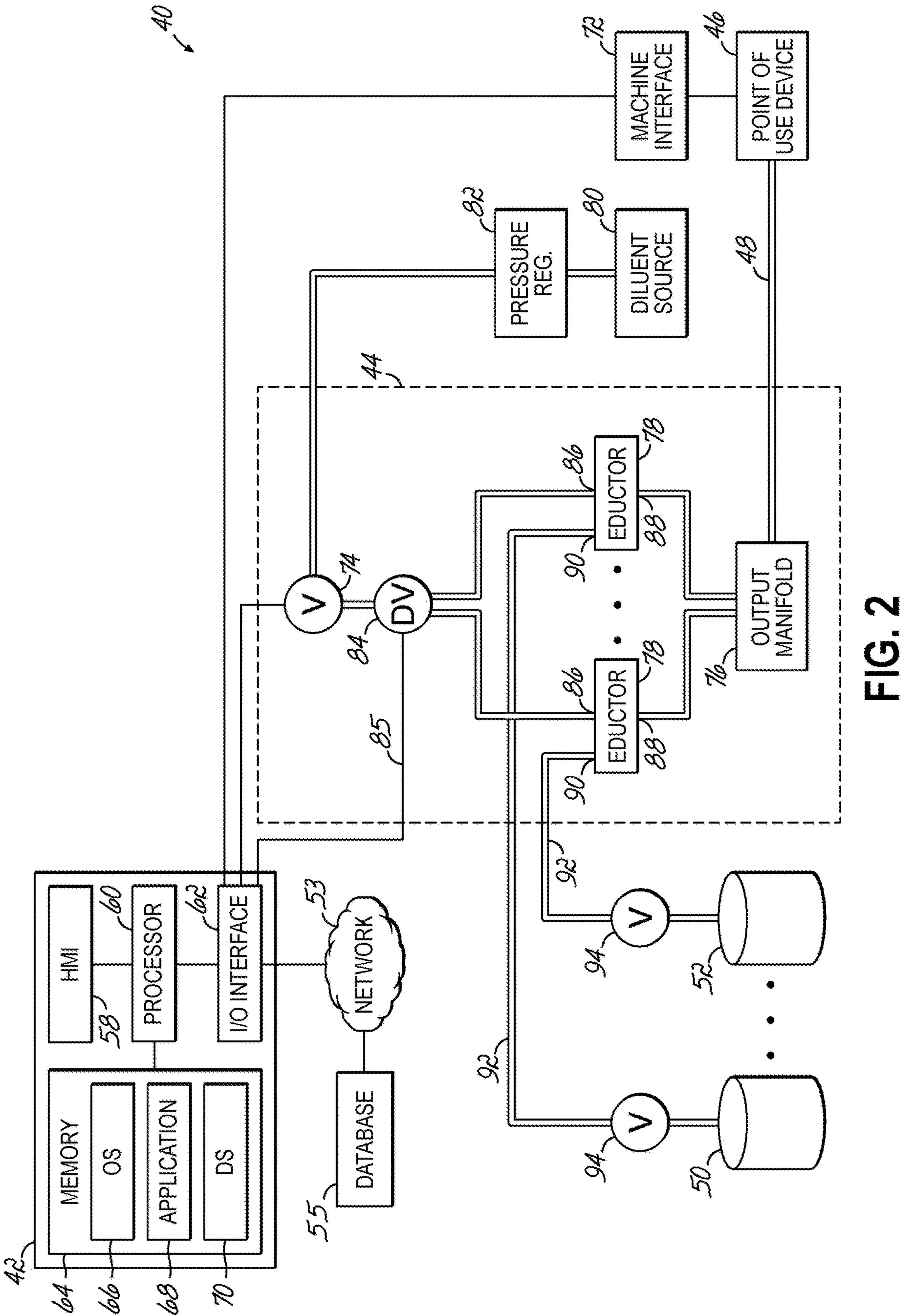
FIG. 2 is a schematic diagram of a chemical dispensing system having a dispenser in accordance with an embodiment of the invention.

FIG. 2 depicts an exemplary operating environment for a dispensing system 40 in accordance with an embodiment of the invention. The dispensing system 40 includes a controller 42 and a dispenser 44 which is configured to dispense chemical solutions to a point-of-use device 46, such as a washing machine, through a dispense line 48. The operating environment of the dispensing system 40 may include one or more sources 50, 52 of a chemical product that are fluidically coupled to the dispenser 44, a network 53, and a database 55. Exemplary chemical products stored in sources 50, 52 may include chemicals such as detergents, water softening agents, bleaches, sanitizers and the like. The types of chemical products and the number of chemical products associated with dispenser 14 will depend on the particular application for which the dispensing system 40 is being used.

The network 53 may include one or more private or public data networks (e.g., the Internet) that enable the exchange of data between systems connected to the network 53. The database 55 may include data and supporting data structures that store and organize the data. In particular, the database 55 may be arranged with any database organization or structure including, but not limited to, a relational database, a hierarchical database, a network database, or combinations thereof. A database management system in the form of a computer software application executing as instructions on a processor may be used to access the information or data stored in records of the database 55 in response to a query, which may be dynamically determined and executed by an operating system or application.

The controller 42 may include a Human Machine Interface (HMI) 58, a processor 60, an input/output (I/O) interface 62, and a memory 64, and may communicate with the database 55 though the network 53. The HMI 58 may include output devices, such as an alphanumeric display, a touch screen, and/or other visual and/or audible indicators that provide information from the processor 60 to a user of the dispensing system 40. The HMI 58 may also include input devices and controls, such as an alphanumeric keyboard, a pointing device, keypads, pushbuttons, control knobs, etc., capable of accepting commands or input from the user and transmitting the entered input to the processor 60.

The processor 60 may include one or more devices configured to manipulate signals (analog or digital) based on operational instructions that are stored in memory 64. Memory 64 may be a single memory device or a plurality of memory devices including but not limited to read-only memory (ROM), random access memory (RAM), volatile memory, non-volatile memory, static random-access memory (SRAM), dynamic random-access memory (DRAM), flash memory, cache memory, or any other device capable of storing information. Memory 64 may also include a mass storage device (not shown), such as a hard drive, optical drive, tape drive, non-volatile solid-state device or any other device capable of storing digital information.

Processor 60 may operate under the control of an operating system 66 that resides in memory 64. The operating system 66 may manage controller resources so that computer program code embodied as one or more computer software applications 68 (such as a dispensing operation application) residing in memory 64 may have instructions executed by the processor 60. In an alternative embodiment, the processor 60 may execute the applications 68 directly, in which case the operating system 66 may be omitted. One or more data structures 70 may also reside in memory 64, and may be used by the processor 60, operating system 66, and/or application 68 to store data.

The I/O interface 62 operatively couples the processor 60 to other components in the operating environment, such as the dispenser 44 and possibly the point-of-use device 46. The I/O interface 62 may include signal processing circuits that condition incoming and outgoing signals so that the signals are compatible with both the processor 60 and the components to which the processor 60 are coupled. To this end, the I/O interface 62 may include analog to digital (A/D) and/or digital to analog (D/A) converters, voltage level and/or frequency shifting circuits, optical isolation and/or driver circuits, and/or any other analog or digital circuitry suitable for coupling the processor 60 to the other components in the operating environment.

Depending on the particular application, the I/O interface 62 may be coupled to the point-of-use device 46 (e.g., washing machine) by a machine interface 72. The machine interface 72 may be configured to transform high voltage trigger signals generated by the point-of-use device 46 into lower voltage signals suitable for the I/O interface 62 of controller 42 and transmit these low voltage trigger signals to the controller 42. The signals may be transmitted over one or more dedicated signal lines, e.g., using a multi-conductor cable, or over a signal serial data line. For embodiments using a serial data line to communicate with the controller 42, the machine interface 72 may further include a processor, a memory in communication with the processor, and a user interface that enables programing of the machine interface 72 to translate trigger signals into a suitable serial communication protocol. In applications where the point-of-use device 46 does not need to communicate with the controller 42, the machine interface 72 may be omitted.

In accordance with an aspect of the invention, the dispenser 44 may include a single input selector valve 74, an output manifold 76, and a plurality of eductors 78 extending between the input selector valve 74 and the output manifold 76. Notably missing from the dispenser 44 is a selector valve for each of the eductors 78 in the dispenser 44. Also missing from the dispenser 44 is an input manifold in the form of an elongated tube that spans the arrangement of in-line eductors. Thus, the dispenser 44 utilizes fewer components and has a simplified design that facilitates improved control. In an exemplary embodiment, the input selector valve 74 may be coupled to a source of diluent 80 by a pressure regulator 82. The pressure regulator 82 may regulate the pressure of the diluent 80 provided to the input selector valve 74. More particularly, the pressure regulator 82 may be configured to maintain the pressure of the diluent 60 at the input selector valve 74 at a relatively constant level so long as the pressure provided by the source of diluent 60 remains above a minimum level. In an alternative embodiment, the pressure regulator 82 may be omitted. The input selector valve 74 effectively operates as an on/off switch for fluidically coupling the diluent 80 with at least one of the eductors 78, and preferably with each of a plurality of eductors, in the dispenser 44 in response to signals from the controller 42.

In a further aspect of the invention, the dispenser 44 includes a diverter valve 84 disposed between the input selector valve 74 and the plurality of eductors 78. The diverter valve 84 is configured to fluidically couple the diluent 80, when the input selector valve 74 is in an opened position, to a select one of the one or more eductors 78 in the dispenser 44 in response to a signal received from the controller 42. As described in more detail below, the diverter valve 84 may also be configured to provide a signal 85 to the controller 42 indicative of a position of the diverter valve 84. Similar to the above, each eductor 78 may include an inlet port 86 in communication with the diverter valve 84 and a discharge port 88 in communication with the output manifold 76. The eductors 78 that are configured as chemical eductors may further include a pickup port 90 disposed between the inlet port 86 and the discharge port 88 fluidically coupled to one of the one or more sources 50, 52 of chemical product. The feed lines 92 may include a check valve 94 to prevent a back-flow from the eductors 78 into the source of chemical product 50, 52.

Figure 3:
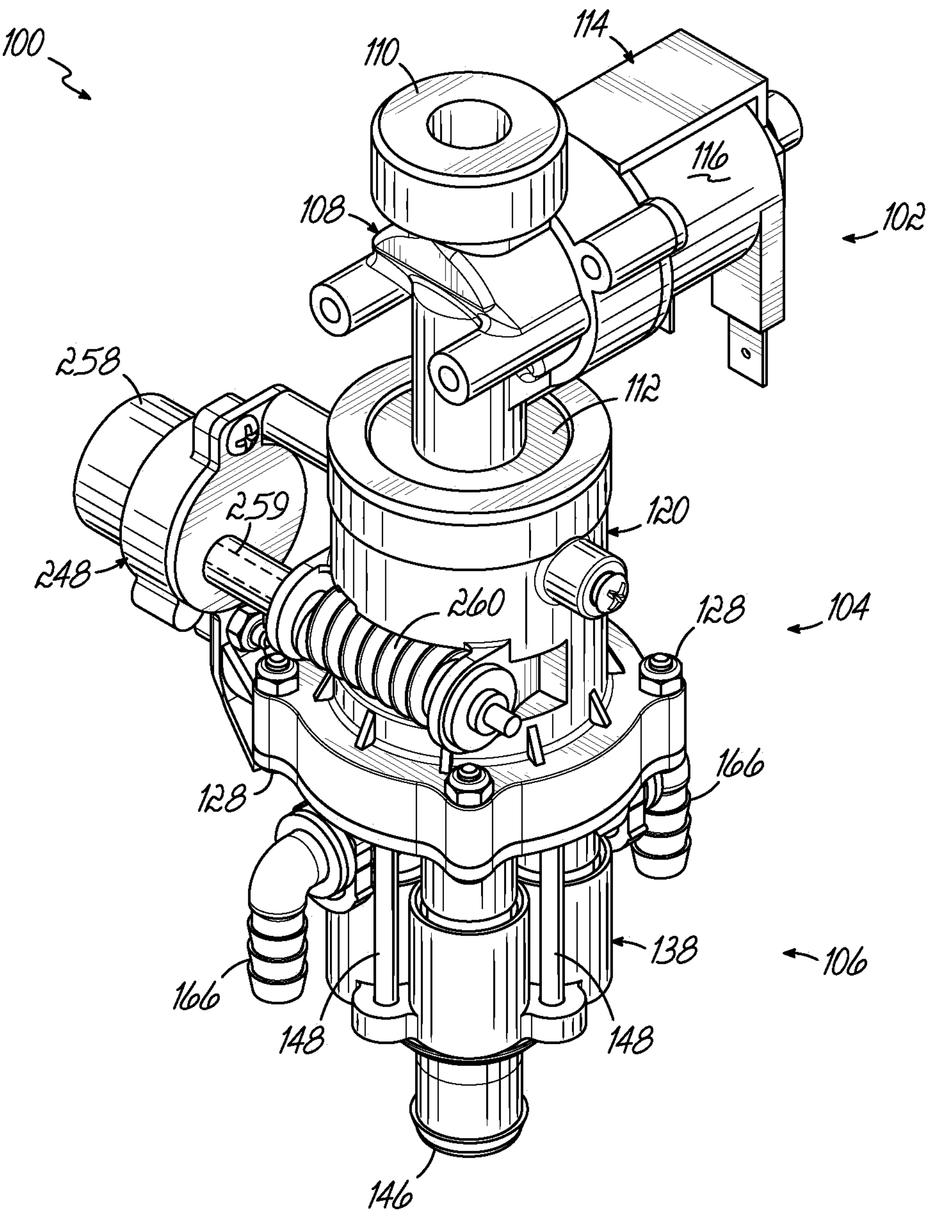
FIG. 3 is a perspective view of a chemical dispenser in accordance with an embodiment of the invention.
Figure 4A:
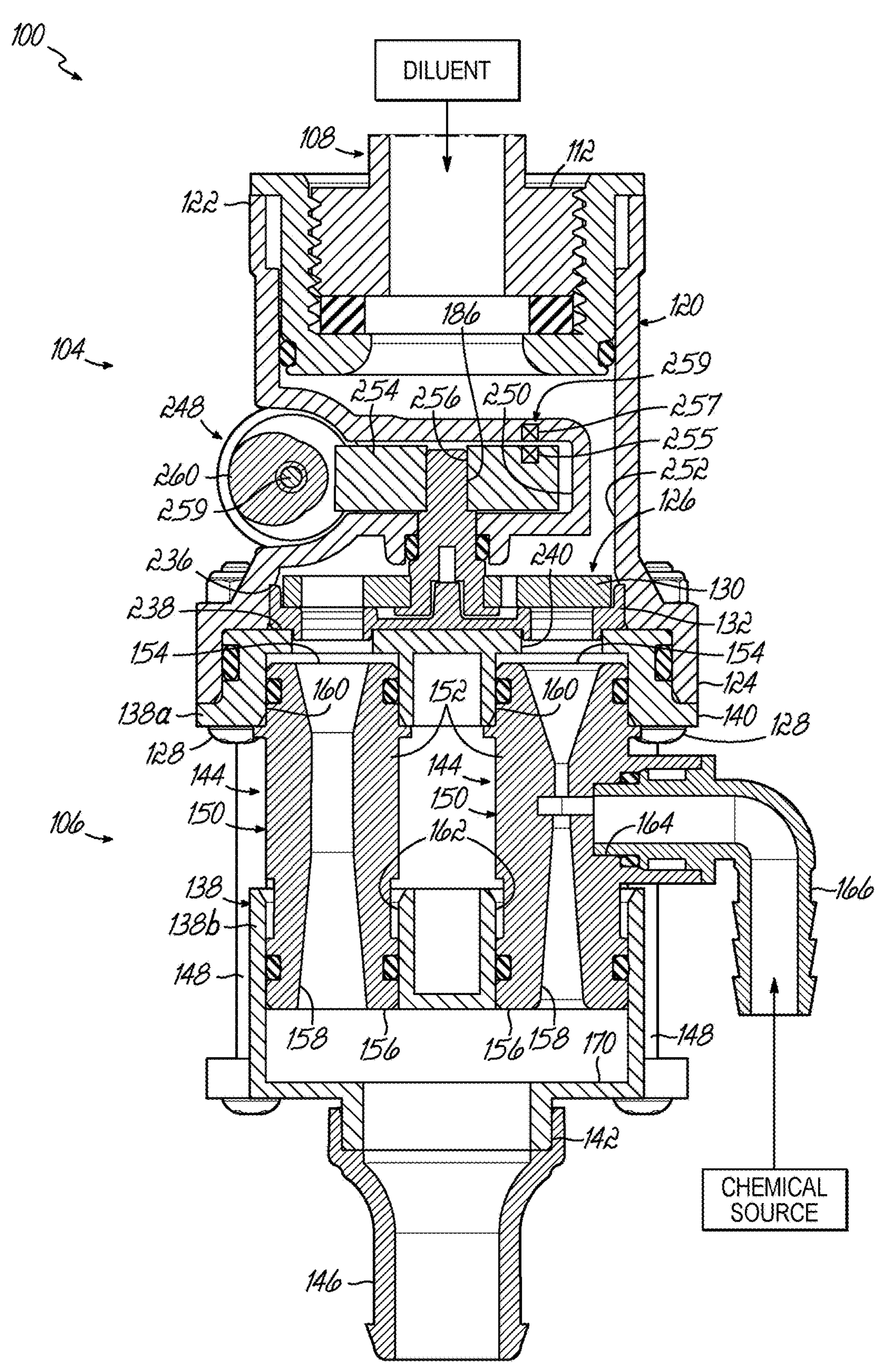
FIG. 4A is a schematic partial cross-sectional view of the chemical dispenser shown in FIG. 3.
Figure 4B:
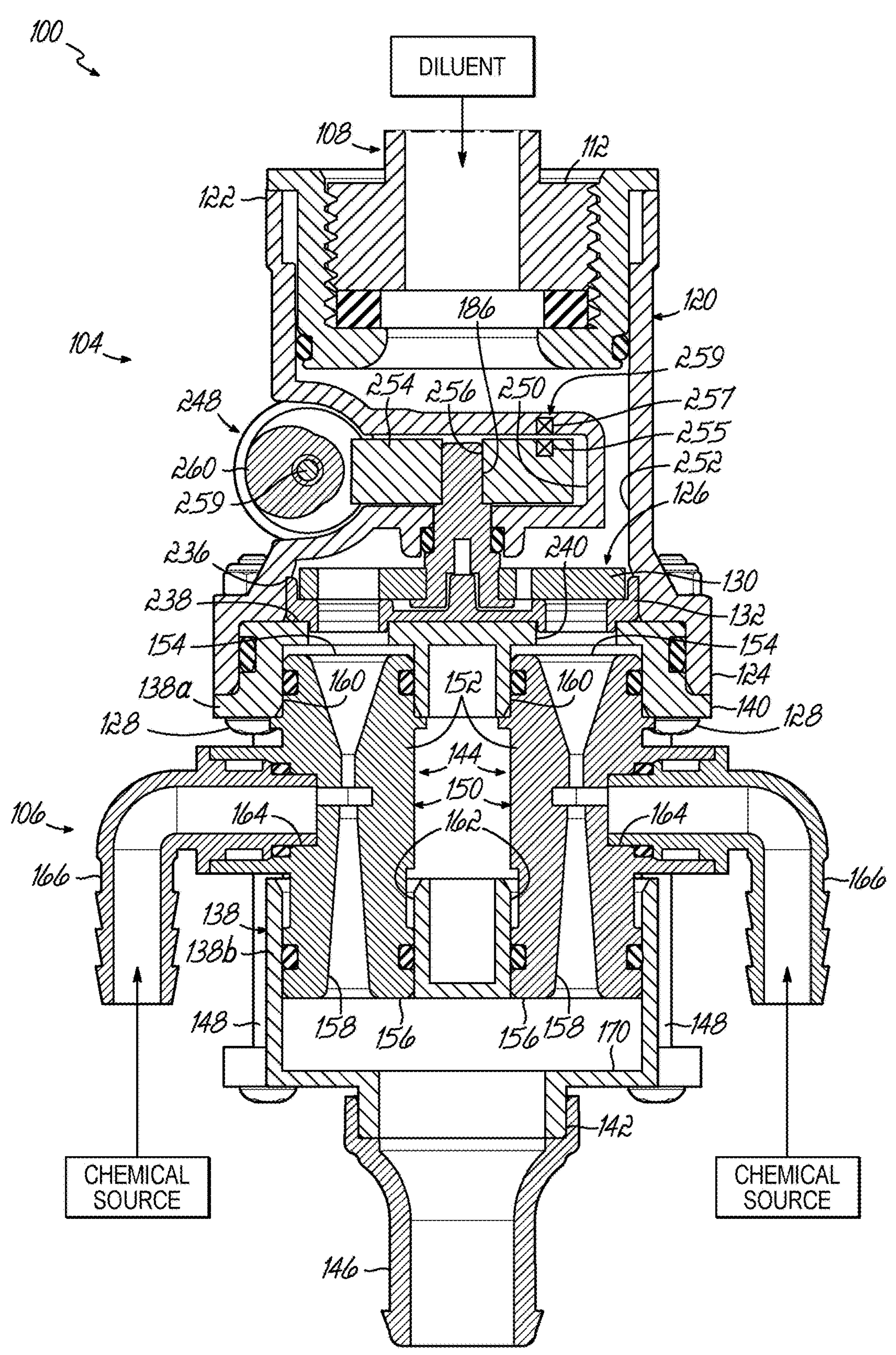
FIG. 4B is another schematic partial cross-sectional view of the chemical dispenser shown in FIG. 3.

FIGS. 3-4B illustrate a dispenser 100 that may be used in the dispensing system 40 in accordance with an exemplary embodiment of the invention. As illustrated in these figures, the dispenser 100 may include an input valve assembly 102, a diverter valve assembly 104, and an eductor assembly 106 generally vertically aligned with each other when the dispenser 100 is fully assembled. The input valve assembly 102 includes a valve housing 108 having an inlet end 110, an outlet end 112, and an input selector valve 114 disposed between the inlet and outlet ends 110, 112. The inlet end 110 may be configured to be coupled to the diluent source 80 and the outlet end 112 may be coupled to the diverter valve assembly 104, as discussed in more detail below. One or more seals may be included to provide a fluid-tight connection between the input valve assembly 102 and the diverter valve assembly 104. In an exemplary embodiment, the input selector valve 114 may have a solenoid 116 for moving the input selector valve 114 between an opened position and a closed position. In the opened position, diluent is free to pass through the inlet selector valve 114 between the inlet and outlet ends 110, 112, and in the closed position, diluent is unable to pass through the inlet selector valve 114. The solenoid 116 is configured to be coupled to the controller 42 for controlling the movement of the input selector valve 114 between the opened and closed positions as needed to dispense a desired chemical solution to the point-of-use device 46.

The diverter valve assembly 104 includes a valve housing 120 having an inlet end 122, an outlet end 124, and a diverter valve 126 disposed between the inlet and outlet ends 122, 124. The inlet end 122 is coupled to the outlet end 112 of the input valve assembly 102, such as through a threaded connection or other suitable type of connection, and the outlet end 124 is coupled to the eductor assembly 106, such as by using suitable fasteners 128. One or more seals may be included to provide a fluid-tight connection between the diverter valve assembly 104 and the eductor assembly 106. As will be discussed in more detail below, the diverter valve 126 is configured to divert diluent to a selected one of the plurality of eductors held in the eductor assembly 106. In one aspect of the invention, the diverter valve 126 may be configured as a rotary type of valve having a rotatable valve head 130 positioned within a stationary valve seat 132. The use of a rotary valve and the resulting generally cylindrical arrangement of the dispenser 100 provides for a much more compact dispenser configuration that significantly reduces the footprint of the dispenser 100 at the industrial facility. In this regard, the compact design of the dispenser 100 may allow the dispenser to be incorporated into a point-of-use device 46, such as a washing machine.

Before providing a more detailed description of the diverter valve 126, it may be instructive to first describe the eductor assembly 106. The eductor assembly 106 includes an eductor housing 138 having an inlet end 140, an outlet end 142, and a plurality of eductors 144 positioned between the inlet and outlet ends 140, 142. In one embodiment, the eductor housing 138 has a two-part construction with an upper eductor housing portion 138*a* and a lower eductor housing portion 138*b*. The upper eductor housing portion 138*a* defines the inlet end 140 and is coupled to the outlet end 124 of the diverter valve assembly 104 as described above. The lower eductor housing portion 138*b* defines the outlet end 142 which is configured to be coupled to a tip or connector 146 for a delivery line (not shown) extending to, for example, a point-of-use device 46. The upper and lower housing portions 138*a*, 138*b* may be coupled together via one or more fasteners 148.

In an exemplary embodiment, the eductors 144 may be configured as a plurality of separate eductor modules 150 having a generally cylindrical body 152 with an inlet end 154, outlet end 156, and a converging-diverging passageway 158 extending therebetween, as is known in the chemical dispensing industry. The inlet ends 154 of the eductor modules 150 are received within respective cavities 160 formed in the upper eductor housing portion 138*a*, and the outlet ends of the eductor modules 150 are received within respective cavities 162 formed in the lower eductor housing portion 138*b*. The eductors 144 may include one or more seals (e.g., O-rings) for creating a fluid-tight connection between the eductors 144 and the eductor housing 138.

According to this arrangement, the eductors 144 are essentially trapped or clamped within the eductor housing 138 by the connection of the upper and lower housing portions 138*a*, 138*b* via the fasteners 148.

One or more of the eductors 144 may be configured as chemical eductors (three shown) and thus be operatively coupled to a chemical source, such as chemical source 50, 52 (FIG. 2). For those chemical eductors, the eductor modules 150 include a pickup port 164 having a connector 166 for a connection to a delivery line (not shown) in communication with the chemical source. In one embodiment, the connector 166 may include a metering tip (not shown) for controlling the amount of chemical product that is drawn into a respective eductor 144. In an alternative embodiment, the metering tip may be omitted. Additionally, one or more eductors 144 may be configured as a flush eductor (one shown), in which case the pickup port 164, connector 166 and metering tip (if any) may be omitted. As illustrated in FIGS. 4A and 4B, with the eductors 144 positioned in the housing 138, the outlet ends 156 of the eductors 144 may be spaced away from the outlet end 142 of the housing 138 to define an output manifold 170 in the lower housing portion 138*b* which is in fluid communication with the connector 146. The output manifold 170 is in fluid communication with each of the eductors 144 in the housing 138 such that the output from all of the eductors 144 is directed to the output manifold 170. While the illustrated embodiment of the lower housing portion 138*b* includes a common output manifold 170 and a single connector 146, in an alternative embodiment (not shown), the lower housing portion 138*b* may be configured to include multiple connectors, wherein each connector is dedicated to a specific eductor 144 in the eductor housing. In this way, the fluid flowing through a particular eductor 144 can have a dedicated connector (and delivery line) for handling that fluid.

Figure 5:
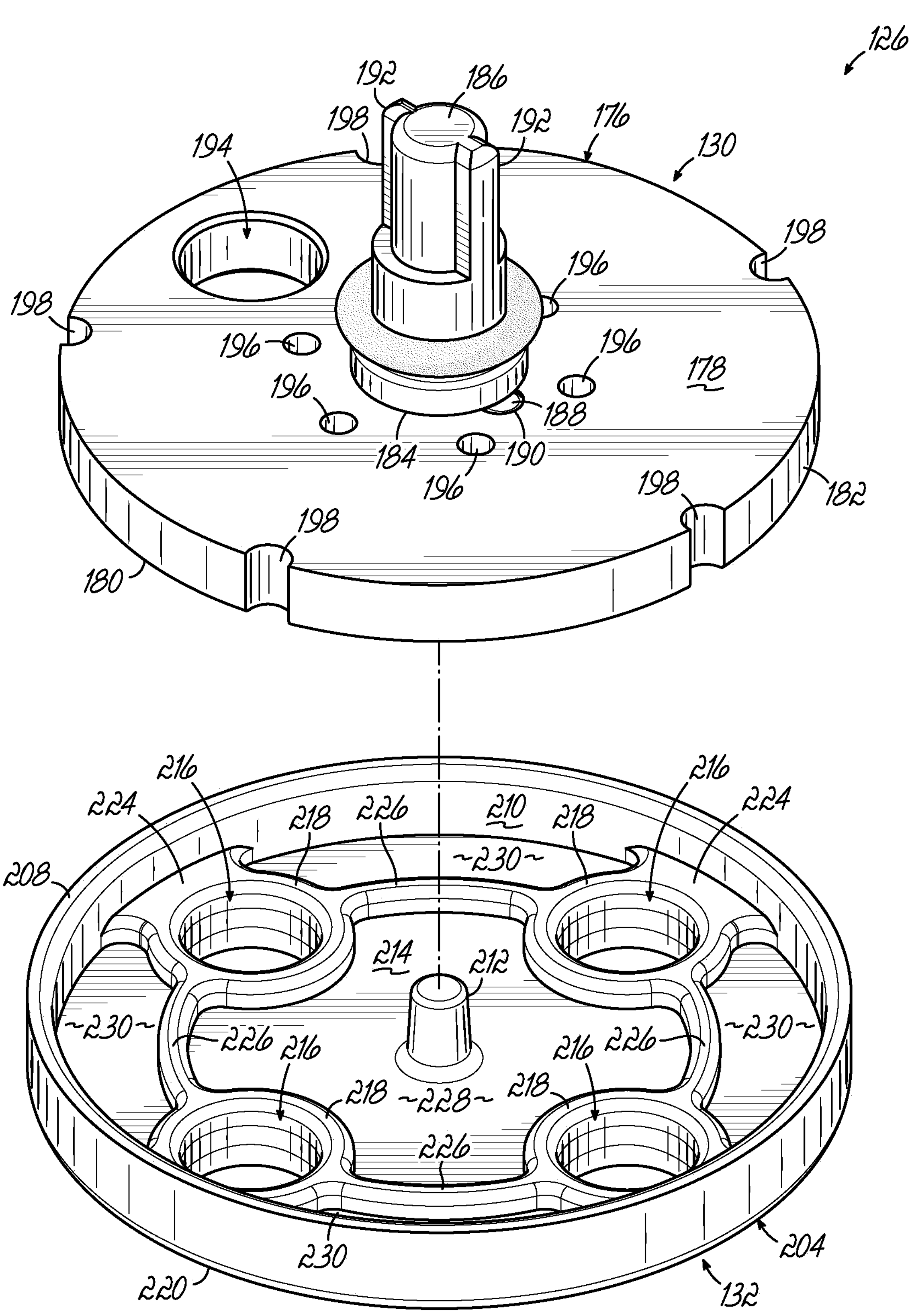
FIG. 5 is a disassembled perspective view of a diverter valve in accordance with an embodiment of the invention.
Figure 5A:
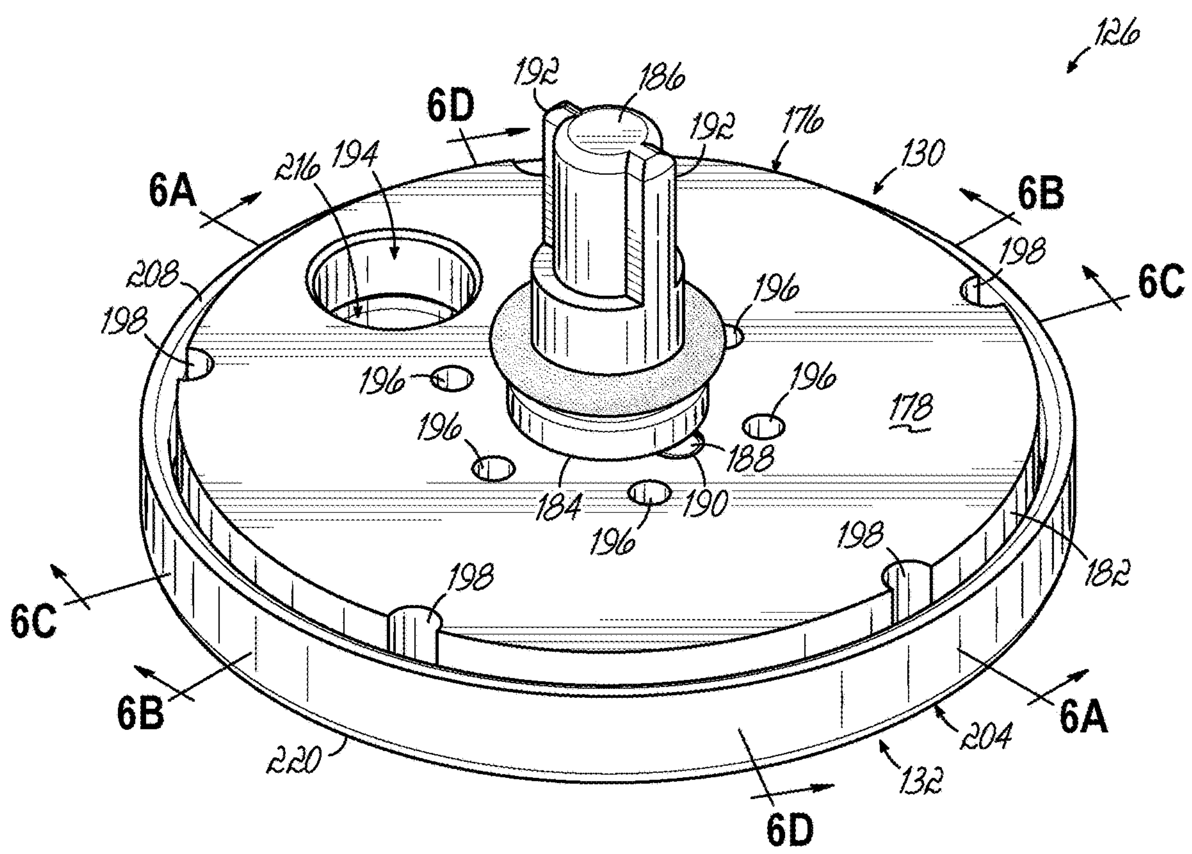
FIG. 5A is an assembled perspective view of the diverter valve shown in FIG. 5.

FIGS. 5 and 5A illustrate a diverter valve 126 in accordance with an exemplary embodiment. As noted above, the diverter valve 126 includes a generally circular valve head 130 and a generally circular valve seat 132. The valve head 130 includes a plate-like body 176 having an upper surface 178, a lower surface 180, and an outer peripheral sidewall 182 extending therebetween. The body 176 may also include a central bore 184 having a post 186 positioned therein. In this regard, a lower end of the post 186 may include one or more keys 188 received within respective keyways 190 in the body 176. The upper end of the post 186 may similarly include one or more keys 192, the purpose of which will be described in more detail below. The body 176 of the valve head 130 should be formed from a durable material with low friction properties. By way of example, the valve head 130 may be formed from nylon, polytetrafluoroethylene (PTFE), or some other suitable synthetic polymer. Additionally, the lower surface 180 of the body 176 may be polished to a fine smoothness to further reduce friction.

To allow diluent to pass through the diverter valve 126, the valve head 130 includes at least one generally circular diluent port 194 extending through the body 176 between the upper and lower surfaces 178, 180 thereof. In accordance with one aspect of the invention, and as will be discussed in more detail below, the valve head 130 may include pressure relief features that are configured to reduce or equalize the pressure drop across the valve head 130 during use. This will allow, for example, the valve head 130 to rotate relative to the stationary valve seat 132 with reduced forces and friction. In any event, in an exemplary embodiment, the pressure relief features may include one or more inner pressure relief ports 196 disposed adjacent the central bore 184 and circumferentially disposed about the central bore 184. The pressure relief features may also include one or more outer pressure relief ports 198 adjacent the peripheral sidewall 182 and circumferentially disposed about the peripheral sidewall 182. In one embodiment, the outer pressure relief ports 198 may be open to the peripheral sidewall 182. In an alternative embodiment, however, the outer pressure relief ports 198 may be spaced radially inward and closed to the peripheral sidewall 182.

The valve seat 132 includes a disk-like body 204 having a lower wall 206 and a peripheral flange 208 extending upwardly from the lower wall 206 to define a cavity 210 configured to receive the valve head 130 therein (FIG. 5A). The body 204 includes a central post 212 extending upwardly from the lower wall 206. In an exemplary embodiment, the inner surface 214 of the lower wall 206 includes a plurality of generally circular eductor ports 216 circumferentially disposed about the central post 212 and extending through the lower wall 206 of the valve seat 132. Each of the eductor ports 216 may be defined by a raised seal 218 extending upwardly from the inner surface 214 of the lower wall 206, but at a height less than the peripheral flange 208. The raised seals 218 that define the eductor ports 216 are configured to be low friction and abrasion resistant to facilitate movement of the valve head 130 relative to the valve seat 132, as explained in more detail below. For example, the body 204 as well as the raised seals 218 may be formed from polyethylene, polytetrafluoroethylene, or suitable polymeric, seal-type materials with low-friction and low-leak properties. In a specific embodiment of the invention, the valve head 130 is made of PTFE and the body 204 and raised seals 218 are made of polypropylene. It should be understood, however, that in alternative embodiments, the valve seat 132 may be formed from an elastomer or have an over-molded configuration to achieve a stable molding with improved sealing. Additionally, the outer surface 220 of the lower wall 206 may include a raised rib or seal 222 disposed about the eductor ports 216 and extending from the outer surface 220. As explained in more detail below, the eductor ports 216 are configured to be generally aligned with and in fluid communication with respective eductors 144 in the eductor housing 138 such that diluent that flows through one of the eductor ports 216 in the valve seat 132 then flows through a respective eductor 144 in the educator housing 138.

In one embodiment, the valve seat 132 may include various strengthening or stiffening features to support the valve seat 132 and/or the raised seals 218 of the eductor ports 216. For example, and as illustrated in FIG. 5, the eductor ports 216 may be radially disposed adjacent the peripheral wall 208 and a stiffening tab 224 may extend between the eductor ports 216 and the peripheral wall 208. Additionally, stiffening ribs 226 may extend between adjacent eductor ports 216 at a location radially inward of the peripheral wall 208. The stiffening tabs 224 and the stiffening ribs 226 may be formed from the same material as the raised seals 218. Such an arrangement of the eductor ports 216 and stiffening ribs 226 provides an inner interstitial region 228 and a plurality of outer interstitial regions 230. As discussed below, the inner pressure relief ports 196 are configured to communicate with the inner interstitial region 228 and the outer pressure relief ports 198 are configured to communicate with the outer interstitial regions 230 to reduce of equalize pressure across the valve head 130.

As illustrated in FIGS. 4A and 4B, when the dispenser 100 is assembled together, the valve seat 132 is fixedly positioned within the diverter valve assembly 104. More particularly, when the diverter valve housing 120 and the eductor housing 138 and coupled together, such as by fasteners 128, the valve seat 132 is essentially clamped between a shoulder 236 in the diverter valve housing 120 and an abutting surface 238 of the upper eductor housing portion 138*a*. As illustrated in these figures, the upper eductor housing portion 138*a* includes an opening 240 for each of the cavities 160 in the upper eductor housing portion 138*a* that receives an eductor 144. The openings 240 are configured to receive a respective raised rib/seal 222 extending from the outer surface 220 of the lower wall 206 of the body 204 to orient and fixedly position the valve seat 132 within the diverter valve assembly 104 of the dispenser 100.

FIG. 5A illustrates the diverter valve 126 assembled together with the valve head 130 positioned within the cavity 210 of the valve seat 132. When so assembled, and as illustrated in FIGS. 4A and 4B, the lower surface 180 of the valve head 130 engages the raised seals 218, stiffening tabs 224 and stiffening ribs 226 on the inner surface 214 of the valve seat 132 in a fluid-tight seal. Additionally, the central post 212 of the valve seat 132 is configured to be received within a cavity 242 in the lower end of the post 186 of the valve head 130 to help maintain axial alignment between the valve head 130 and the valve seat 132.

As noted above, the valve head 130 is configured to be rotatable relative to the valve seat 132 so that the diluent port 194 in the valve head 130 may be placed in communication with each of the educator ports 216 in the valve seat 132. In one aspect of the invention, the valve head 130 may be operatively coupled to a drive assembly 248 for rotating the valve head 130 about its central axis in at least one rotational direction. In an exemplary embodiment, the drive assembly 248 may be configured to rotate the valve head 130 in both the clockwise and counterclockwise directions. To this end and as best illustrated in FIGS. 4A and 4B, the diverter valve housing 120 may include a pocket 250 disposed above and adjacent the diverter valve 126 that is external to the internal passageway 252 that defines the diluent flow path through the diverter valve housing 120. The post 186 of the valve head 130 is configured to extend through a wall of the diverter valve housing 120 and into the pocket 250. One or more seals may be included to provide a fluid-tight seal. In an exemplary embodiment, the drive assembly 248 includes a drive gear 254 positioned within the pocket 250 and coupled to the upper end of the post 186 of the valve head 130. In this regard, the drive gear 254 includes a central bore 256 having one or more keyways (not shown) that receive the one or more keys 192 on the upper end of the post 186. In this way, when the drive gear 254 is rotated, the valve head 130 is also configured to rotate. In an embodiment of the invention, the drive gear 254 may also include a magnet 255 configured to activate a Hall effect sensor 257, as described in more detail below.

With reference to FIGS. 3, 4A and 4B, the drive assembly 248 further includes a drive motor 258 having a rotor (not shown) and a worm gear 260 that are also external to the diverter valve housing 120. In an exemplary embodiment, the drive motor 258 may be a closed-loop controllable type of motor, such as a motor including one or more position sensors that provide a signal indicative of the position of the rotor, an open-loop controllable type of motor, such as a stepper motor, or any other suitable controllable motor. In any event, the drive motor 258 is configured to be coupled to controller 42 of a dispensing system for controlling the position of the valve head 130 relative to the valve seat 132.

When the drive motor 258 is activated, the worm gear 260 rotates about its central axis. The teeth of the worm gear 260 are configured to mesh with the teeth of the drive gear 254 such that rotation of the worm gear 260 rotates the drive gear 254, and thus the valve head 130. The drive motor 258, worm gear 160 and drive gear 254 may be configured to rotate the valve head 130 at a desired angular speed and in a desired direction (i.e., clockwise or counterclockwise). By way of example and without limitation, the drive assembly 248 may be configured to rotate the valve head 130 relative to the valve seat 132 between about 30 revolutions per minute and about 120 revolutions per minute, with 45 to 50 revolutions per minute being typical. Other ranges and values are possible depending on, for example, the particular application and one of ordinary skill in the art will understand how to configure the drive assembly 248 to rotate at a desired speed and in a desired direction. In an embodiment of the invention, the speed and direction in which the valve head 130 is rotated may be selectively adjusted by the controller 42, such as in response to one or more operating conditions. Exemplary operating conditions that may be used by the controller 42 to control speed and direction of rotation can include whether the input selector valve 114 is opened or closed, the pressure of the diluent, the position of the valve head 130, whether an operation to calibrate the position of the valve head 130 is being performed, or any other suitable operating condition.

FIGS. 6A-6D illustrate various cross-sectional views through the diverter valve 126 that demonstrate certain features of the diverter valve 126. By way of example and in accordance with an aspect of the invention, the diverter valve 126 is configured to minimize the pressure drop across the valve head 130. When diluent is exposed to the diverter valve 126, for example, upstream of the valve head 130 when the input selector valve 114 is opened, the diluent pressure exerts a force on the valve head 130 and presses it toward the valve seat 132. If the pressure drop across the valve head 130 is high, then the force that presses the valve head 130 against the valve seat 132 is correspondingly high. Such a high pressing force would make it difficult to rotate the valve head 130 relative to the valve seat 132 during operation of the dispenser 100. In other words, the drive assembly 248 would have to exert a relatively large torque in order to rotate the valve head 130 relative to the valve seat 132. This would require, for example, a larger drive motor 258 to achieve the higher torques. Additionally, such a large pressing force would also increase friction/abrasion on the raised seals 218, stiffening tabs 224, and stiffening ribs 226 causing the seals to wear quickly and prompting regular costly maintenance to replace the seals 218. As mentioned above, in an exemplary embodiment, the valve head 130 includes inner and outer pressure relief ports 196, 198 to reduce or effectively eliminate the pressure drop across the valve head 130. In this way, the force at which the valve head 130 is pressed into the valve seat 132 may be relatively unaffected by the diluent pressure upstream of the valve head 130, and as a result this force may be minimized and held relative constant during the use of the dispenser 100. For example, the force at which the valve head 130 may be pressed into the valve seat 132 may be sufficient to just maintain a fluid-tight seal between the valve head 130 and the valve seat 132.

Figure 6A:
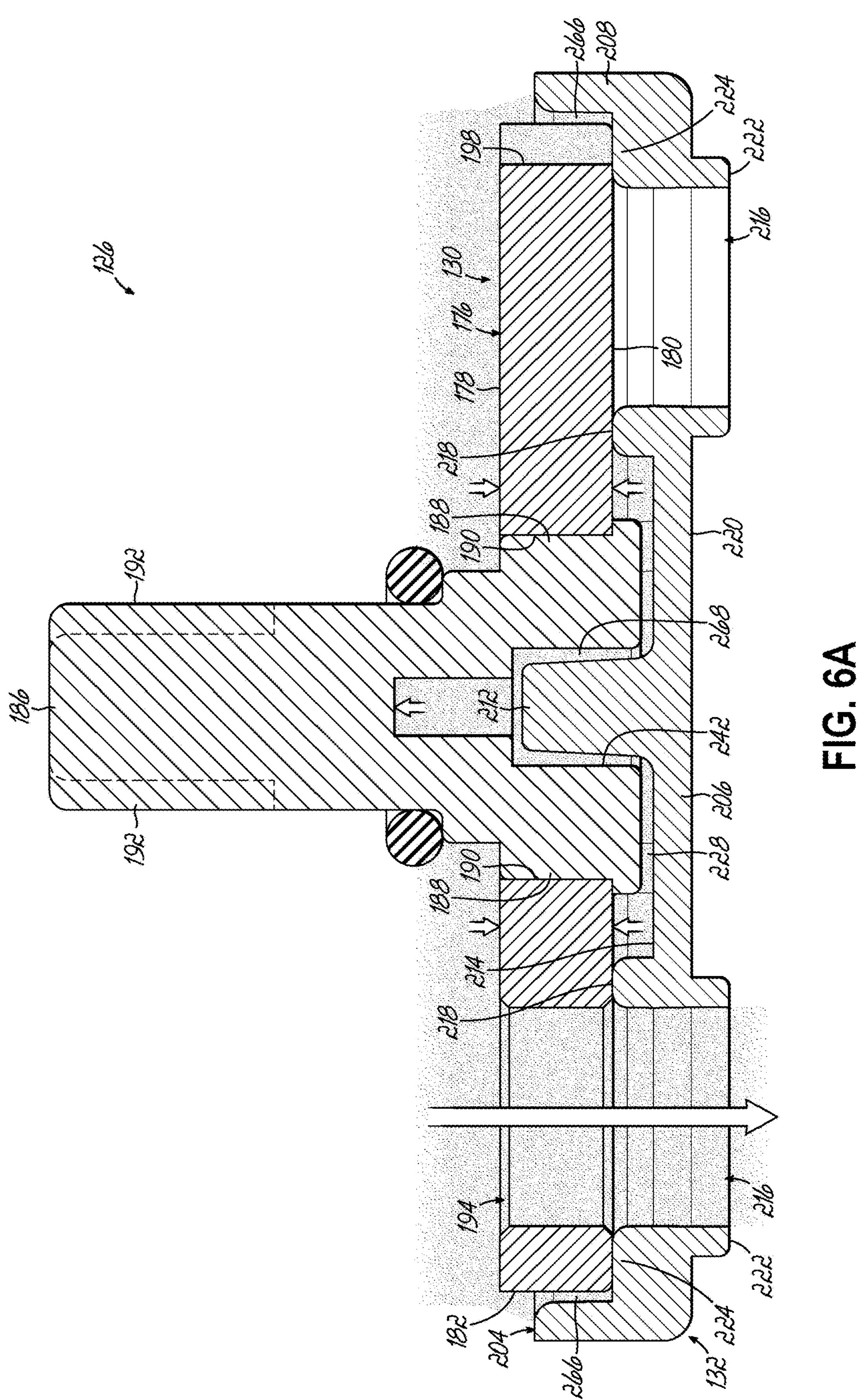
FIG. 6A is a cross-sectional view of the diverter valve shown in FIG. 5A generally taken along line 6A-6A.

FIG. 6A illustrates a cross-sectional view through the diverter valve 126 generally along line 6A-6A shown in FIG. 5A. This cross-sectional view bisects the diluent port 194 of the valve head 130 when aligned with an eductor port 216 in the valve seat 132, and also bisects an outer pressure relief port 198 in the valve head 130. The lower surface 180 of the valve head 130 engages the raised seal 218 of the eductor port 216 to provide a fluid-tight seal, thereby allowing the diluent to flow through the aligned ports 198, 216 and into a selected one of the eductors 144 in the eductor housing 138. As illustrated in FIG. 6A, the other eductor ports 216 in the valve seat 132 are closed off by the valve head 130 such that diluent cannot flow through the diverter valve 126 and to the eductor housing 138 via these other educator ports 216.

FIG. 6A further illustrates the outer pressure relief port 198 engaging against the raised seal 218 and/or stiffening tab 224 to prevent diluent flow through that particular outer pressure relief port 198 and to an outer interstitial region 230 (not shown in FIG. 6A). FIG. 6A further shows the inner interstitial region 228 filled with diluent (that gained access to the inner interstitial region 228 via inner pressure relief ports 196 not shown in this view). Since the pressure of diluent above and below the valve head 130 is approximately the same, there is effectively no pressure drop across the valve head 130 and thus no net force pressing the valve head 130 into the valve seat 132 due to the diluent pressure. Furthermore, FIG. 6A illustrates a small gap 266 between the peripheral sidewall 182 of the valve head 130 and the peripheral flange 208 of the valve seat 132 which is filled with diluent. This slight gap 266 effectively operates as a fluid bearing to facilitate the rotation of the valve head 130 relative to the valve seat 132. A similar gap 268 and fluid bearing may be provided between the posts 186, 212 of the valve head 130 and the valve seat 132, respectively.

Figure 6B:
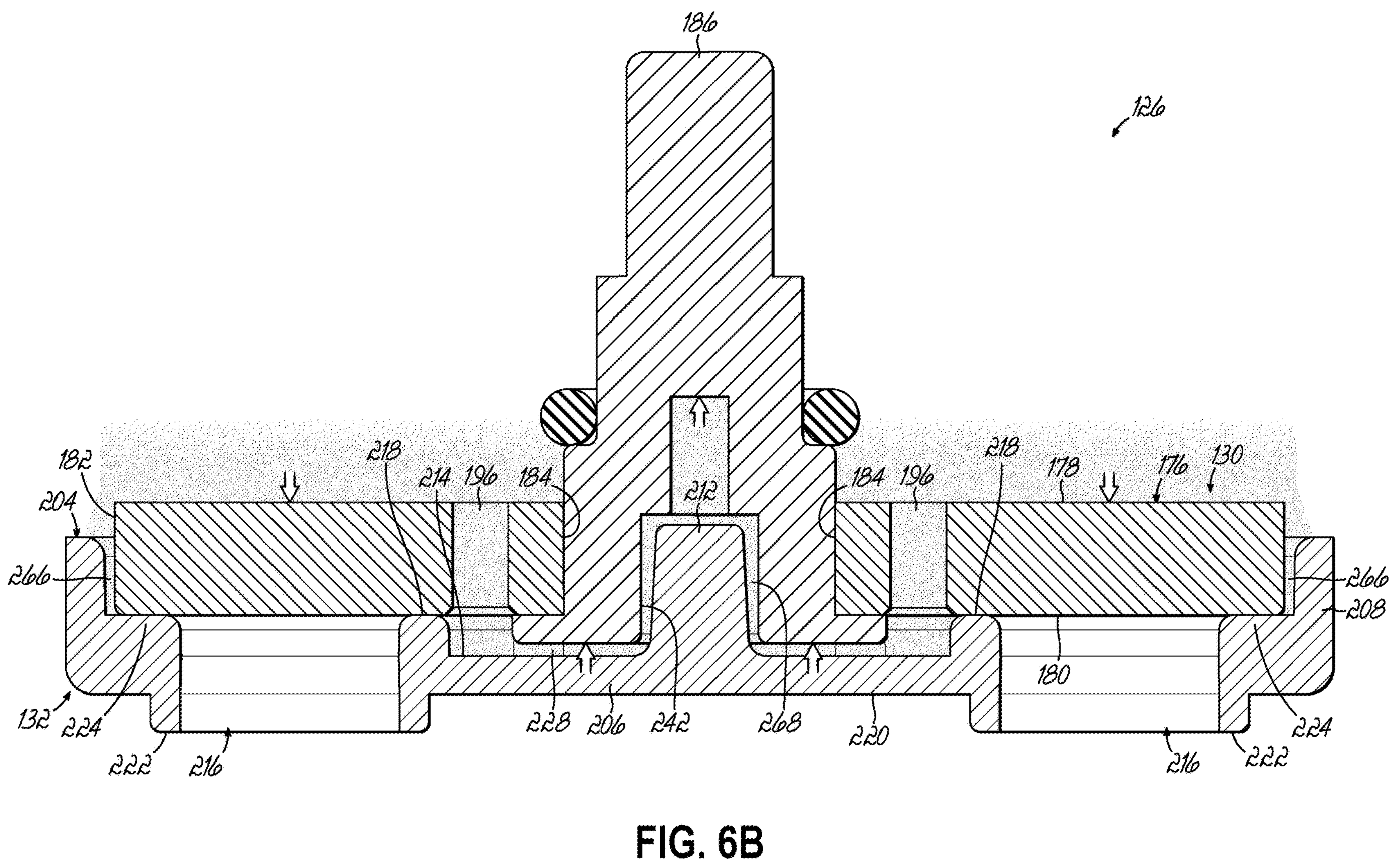
FIG. 6B is another cross-sectional view of the diverter valve shown in FIG. 5A generally taken along line 6B-6B.

FIG. 6B illustrates a cross-sectional view through the diverter valve 126 generally along line 6B-6B shown in FIG. 5A. This cross-sectional view does not bisect the diluent port 194 in the valve head 130 but does bisect two eductor ports 216 in the valve seat 132. As illustrated in this figure, the lower surface 180 of the valve head 130 engages the raised seals 218 of the eductor ports 216 to seal those ports off and thus prevent diluent from flowing to those ports 216 and their respective eductors 144 in the eductor housing 138. FIG. 6B further illustrates a cross-sectional view through two inner pressure relief ports 196 in the valve head 130 (but not through any outer pressure relief ports 198). As further illustrated in this figure, the inner pressure relief ports 196 provide a fluid path for diluent to pass through the valve head 130 and to fill the inner interstitial region 228 beneath the valve head 130. Again, this results in effectively no pressure drop across the valve head 130 and thus no net force pressing the valve head 130 into the valve seat 132 due to the diluent pressure.

Figure 6C:
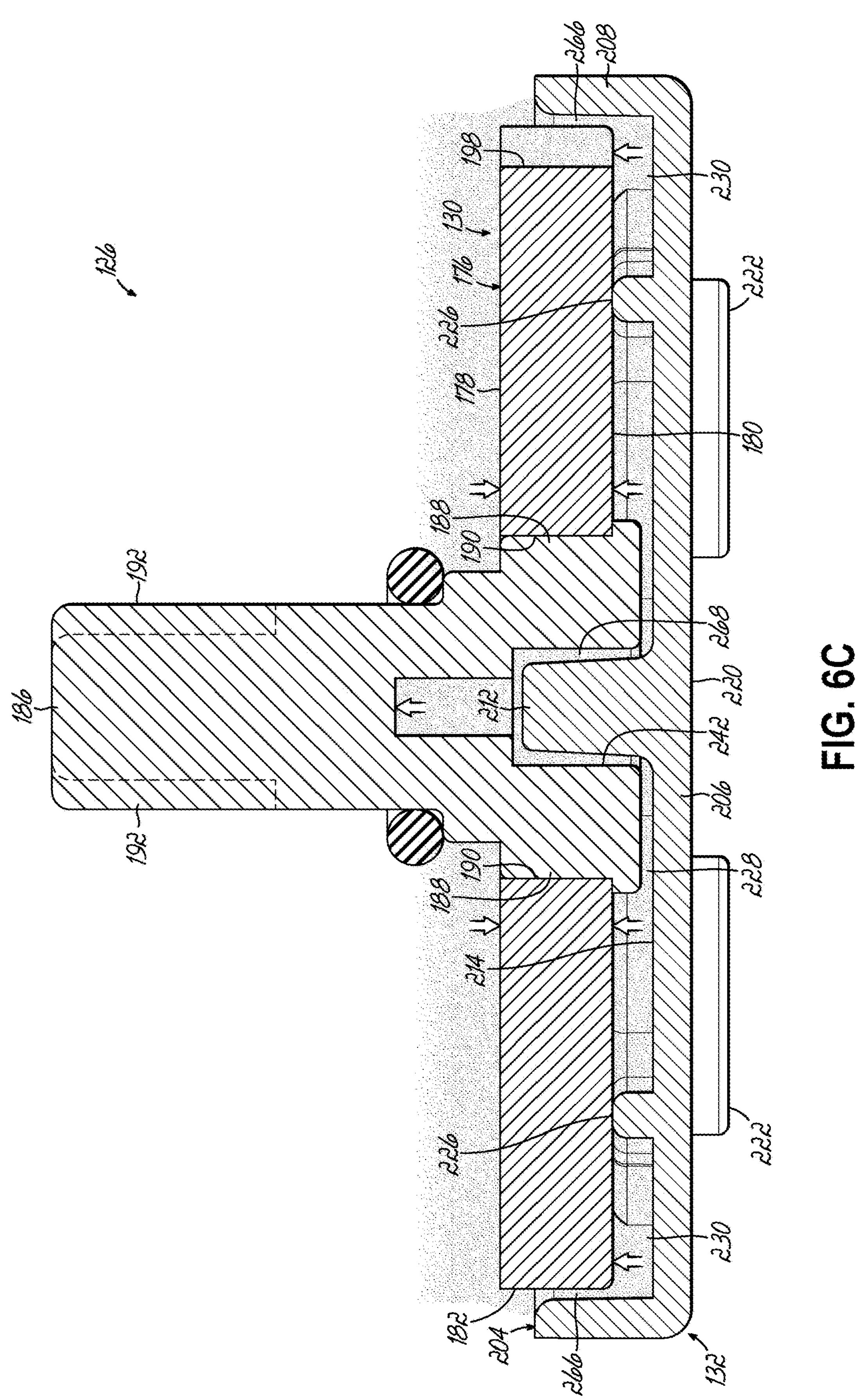
FIG. 6C is another cross-sectional view of the diverter valve shown in FIG. 5A generally taken along line 6C-6C.

FIG. 6C illustrates a cross sectional view through the diverter valve 126 generally along line 6C-6C shown in FIG. 5A. This cross-sectional view does not bisect the diluent port 194 in the valve head 130 or any eductor ports 216 in the valve seat 132 but does bisect an outer pressure relief port 198 in the valve head 130. As illustrated in this figure, the lower surface 180 of the valve head 130 engages a stiffening rib 226 of the of the valve seat 132 to form a seal between the inner interstitial region 228 and one of the outer interstitial regions 230. As further illustrated in this figure, the outer pressure relief port 198 provides a fluid path for diluent to pass through the valve head 130 and to fill one of the outer interstitial regions 230 beneath the valve head 130. While FIG. 6B shows one outer interstitial region 230, it should be recognized that each interstitial region 230 will have a corresponding outer pressure relief port 198 associated with the region. Again, this results in effectively no pressure drop across the valve head 130, and thus no net force pressing the valve head 130 into the valve seat 132 due to the diluent pressure.

Figure 6D:
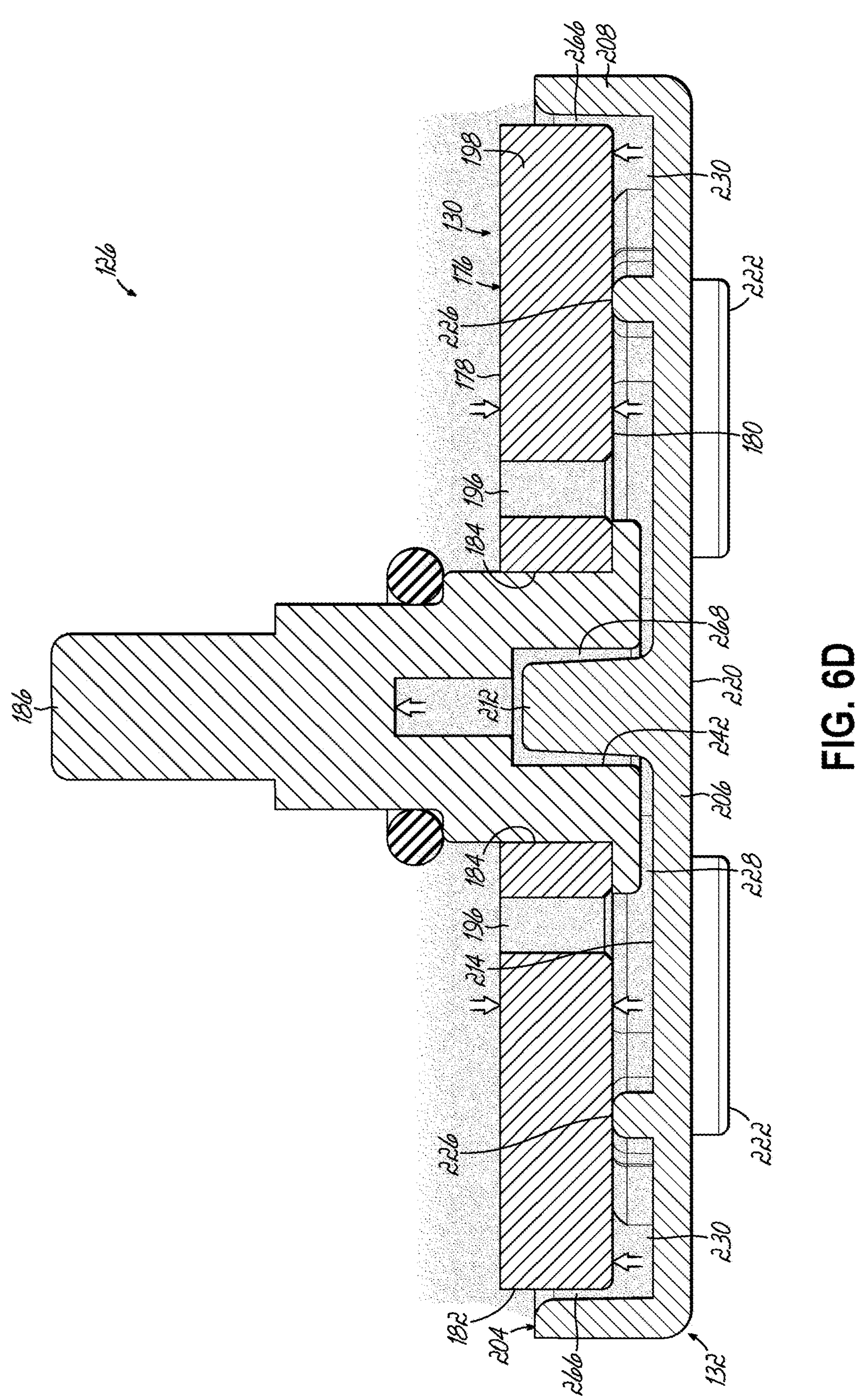
FIG. 6D is another cross-sectional view of the diverter valve shown in FIG. 5A generally taken along line 6D-6D.

FIG. 6D illustrates a cross sectional view through the diverter valve 126 generally along line 6D-6D shown in FIG. 5A. This cross-sectional view does not bisect the diluent port 194 in the valve head 130 or any eductor ports 216 in the valve seat 132 but does bisect two inner pressure relief ports 196 in the valve head 130. As illustrated in this figure, the lower surface 180 of the valve head 130 engages a stiffening rib 226 of the of the valve seat 132 to form a seal between the inner interstitial region 228 and two of the outer interstitial regions 230. As further illustrated in this figure, the inner pressure relief ports 196 provide a fluid path for diluent to pass through the valve head 130 and to fill the inner interstitial region 228 beneath the valve head 130 as discussed above.

Based on the above, it should be understood that the valve head 130 and the valve seat 132 are arranged to allow the diluent port 194 of the valve head 130 to align with and seal to each of the eductor ports 246 in the valve seat 132 through rotation of the valve head 130, and thereby provide diluent flow through a selected one of the eductors 144 positioned in the eductor housing. Moreover, the valve head 130 and valve seat 130 are arranged to minimize or effectively eliminate a pressure drop across the valve head 130 to thereby provide a relatively low, consistent force at which the valve head 130 is pressed against the valve seat 132 (e.g., created at least in part by the connection of the valve head 130 to the diverter valve housing 120). This in turn reduces the torque requirement of the drive motor 258 for turning the valve head 130 (thus allowing for a smaller motor) and also reduces the wear on the raised seals 218 (thus reducing the frequency of maintenance and its associated costs).

Now that the diverter valve 126 has been described in some detail, including the relationship and interactions between the valve head 130 and the valve seat 132, operation of the chemical dispenser 100, such as in the context of a chemical dispensing system 40, for dispensing chemical solutions will now be described. There are many different ways to configure the chemical dispenser 100 depending on, for example, the number of chemicals/flushes required by a certain application. In the above, the eductor housing 138 included a total of four eductors 144, with three eductors being chemical eductors and one eductor 144 being a flush eductor (e.g., the left-hand eductor 144 in FIG. 4A). It should be understood, however, that this arrangement is merely exemplary and the dispenser 100 may include more or less eductors 144 (e.g., 2-8 eductors) arranged in various combinations of one or more chemical eductors and one or more flush eductors. The size of the diverter valve 126 and the number of eductor ports 216 will have to be adjusted to accommodate the number of desired eductors 144 carried by the eductor housing 138, as understood by one of ordinary skill in the art.

When the dispenser 100 is directed to dispense a chemical solution, such as under the control of controller 42 according to a dispense program, the solenoid 116 will be activated to position the input selector valve 114 in its opened position, thereby providing diluent from diluent source 60 to the dispenser 100. Prior to this, however, the drive assembly 248 may be activated by controller 42 in order to position the diluent port 194 on the valve head 130 at a desired eductor port 216 on the valve seat 132 (e.g., corresponding to the first chemical product to be dispensed in accordance with the dispense program). Thus, when the input selector valve 114 is opened, diluent flows through the aligned ports 194, 216 and into the selected eductor 144 in the eductor housing 138. As the diluent flows through the eductor 144, chemical product may be drawn into the diluent flow (assuming the eductor 144 is a chemical eductor) and the resulting chemical solution flows out of the eductor 144 and into the output manifold 170 in the eductor housing 138. From here, the chemical solution flows out of the connector 146 and into a delivery line for delivering the chemical solution to the point-of-use device 46.

In one embodiment, after the chemical solution has been dispensed, the dispenser 100 (and delivery line) may be flushed. In this regard, the controller 42 may activate drive assembly 248 to rotate the valve head 130 relative to the valve seat 132 so that the diluent port 194 of the valve head 130 is aligned with the eductor port 216 that corresponds to a flush eductor 144. Diluent then flows through the aligned ports 194, 216 and into the flush eductor 144 in the eductor housing 138. The diluent (without picking up a chemical product) flows out of the eductor 144, into the output manifold 170 in the eductor housing 138, through the connector 146, and through the delivery line to thereby flush the chemical dispenser 100 and delivery line to the point-of-use device 46. In one embodiment, the input selector valve 114 may remain open during the movement of the diverter valve 126, and more particularly the movement of the valve head 130 between the chemical and flush eductor ports 216 in the valve seat 132. By maintaining the input selector valve 114 open during this transition, the number of times the solenoid valve 116 opens and closes the input selector valve 114 may be decreased, which prolongs the operating life of the solenoid 116 and selector valve 114 and decreases required maintenance for maintaining the chemical dispensing system 40 operational. The invention, however, is not so limited and it should be recognized that the input selector valve 114 may be closed between a chemical dispense operation and a diluent flush operation.

When another chemical product is to be dispensed, the steps described above may be repeated with the drive assembly 248 activated to position the diluent port 194 on the valve head 130 at another eductor port 216 on the valve seat 132 that corresponds to an eductor 144 coupled to the desired chemical product to be dispensed. Thus, the dispenser 100 may be configured to operate in the following sequence: C1-F-C2-F . . . Cn-F, where C1 is the dispensing of the first chemical product, C2 is the dispensing of the second chemical product, Cn is the dispensing of the nth chemical product, and F is a diluent flush. Again, the input selector valve 214 may remain open between the chemical dispense operations and the flush operations or may be closed between each of the chemical dispense operations and the flush operations.

It should be understood that aspects of the invention are not limited to the particular sequence described above. For the above, a flush operation was performed after each chemical dispense operation. Depending on the particular application, however, that may be unnecessary. For example, in one embodiment, multiple chemical dispense operations may be performed before a flush operation is performed. For such an application, the dispensing sequence may be as follows: C1-C2- . . . Cn-F. Similar to the above, the input selector valve 214 may remain open between dispense operations or may be closed between the dispense operations. For example, such a dispensing sequence may make sense when multiple non-reactive chemical products are being delivered to a point-of-use device at roughly the same time such that a flush between chemical dispense operations is not required.

Figure 7:
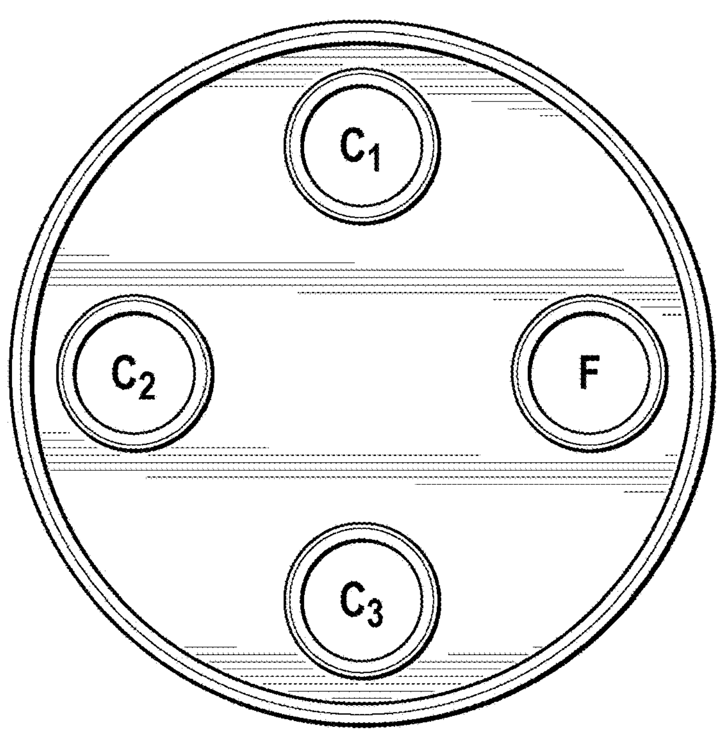
FIG. 7 is a schematic illustration of a diverter valve seat and eductor arrangement in accordance with one embodiment of the invention.

Based on the above, it should be clear that the dispenser 100 may be configured to dispense chemical products in a wide range of dispensing sequences, depending on the particular application in which the dispenser is being used. The configuration of the diverter valve 126 as a rotary type valve introduces a number of interesting design considerations. For example, the assignment of the eductor ports 216 on the valve seat 132 (and the arrangement of the eductors 144 in the eductor housing 138) may not be arbitrary but may be specifically selected to optimize a particular parameter or variable of the system. By way of example and without limitation, for the following dispensing sequence C1-C2-C3-F, the valve seat 132 and eductors 144 in the eductor housing 138 might be arranged as schematically illustrated in FIG. 7. Thus, the dispenser 100 might be arranged to start with the diluent port 194 of the valve head 130 aligned with the eductor port 216 corresponding to C1, and then rotate the valve head 130 in a counterclockwise direction to fulfill the dispense sequence. Thus, one rotation of the valve head 130 completes a single iteration of the dispense sequence. If the chemical products are non-reactive and configured to be delivered together, the input selector valve 114 may remain open for the entire dispense sequence. Again, this may prolong the operational life of the solenoid 116 and reduce maintenance.

Figure 8A:
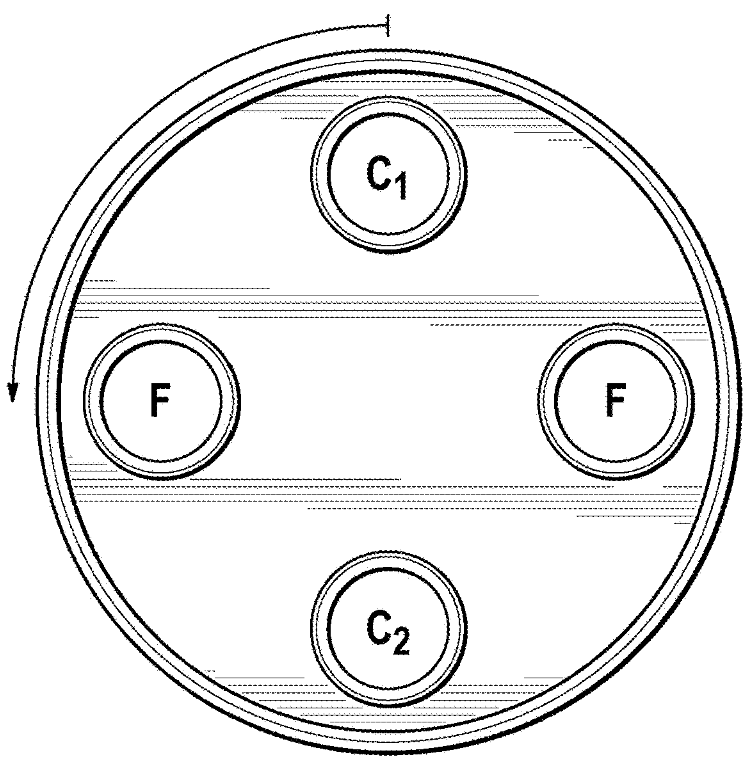
FIG. 8A is another schematic illustration of a diverter valve seat and eductor arrangement in accordance with one embodiment of the invention.
Figure 8B:
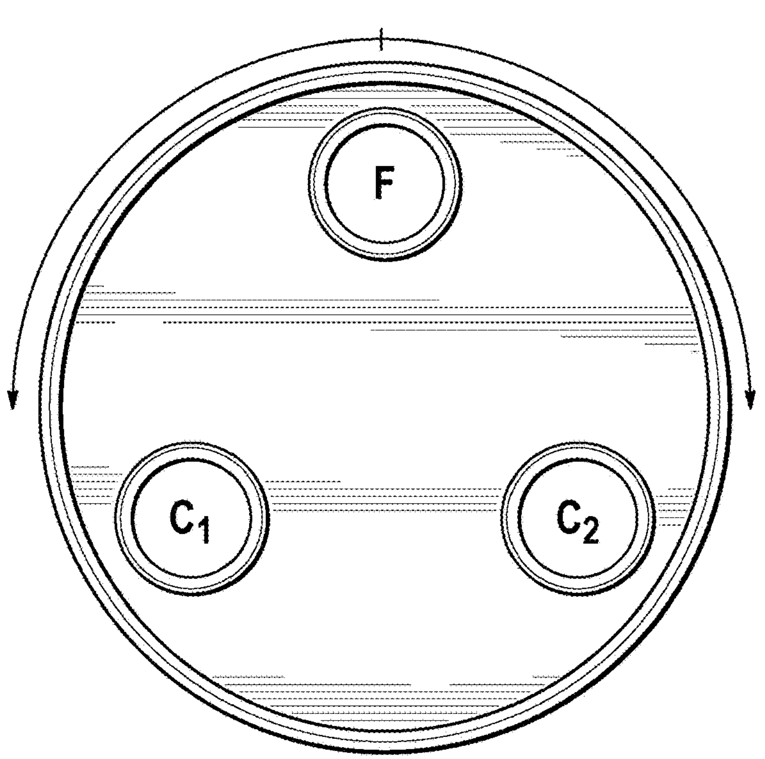
FIG. 8B is another schematic illustration of a diverter valve seat and eductor arrangement in accordance with one embodiment of the invention.

When optimizing the arrangement of the eductor ports 216 in the valve seat 132 and the eductors 144 in the eductor housing 138, it should be kept in mind that the drive assembly 248 may be configured to rotate the valve seat 130 in both a clockwise and counterclockwise direction relative to the valve seat 132. By way of example, FIG. 8A schematically illustrates the arrangement of the valve seat 132 and the eductors 144 for the following sequence C1-F-C2-F, wherein one rotation of the valve head 130 in the counterclockwise direction completes one iteration of the dispense sequence. FIG. 8B, however, schematically illustrates an alternative arrangement of the valve seat 132 and the eductors 144 for the same sequence but when the valve seat 130 is configured to rotate in both the counterclockwise and clockwise directions. In this case, fewer eductor ports 216 and eductors 144 can be used to complete the dispense sequence.

Based on the above, it should be clear that the arrangement of the valve seat 132 and the eductors 144 in the eductor housing 138 may not be arbitrary but may be selected to optimize a particular variable or parameter for a given dispense sequence. By way of example and without limitation, the arrangement of the valve seat 132 and the eductors 144 in the eductor housing 138 may be designed to: i) minimize the number of times the solenoid 116 opens/closes the input selector valve 114; ii) perform one rotation of the valve seat 130 for one complete iteration of the dispensing sequence; iii) minimize distance traveled by the valve head 130 (i.e., reduce wear); and/or iv) minimize the amount of time a particular dispensing sequence takes. Of course, other design criteria may be optimized and those of ordinary skill in the art will understand how to arrange the valve seat 132 and eductors 144 in the eductor housing 138 to achieve the optimization.

Figure 9:
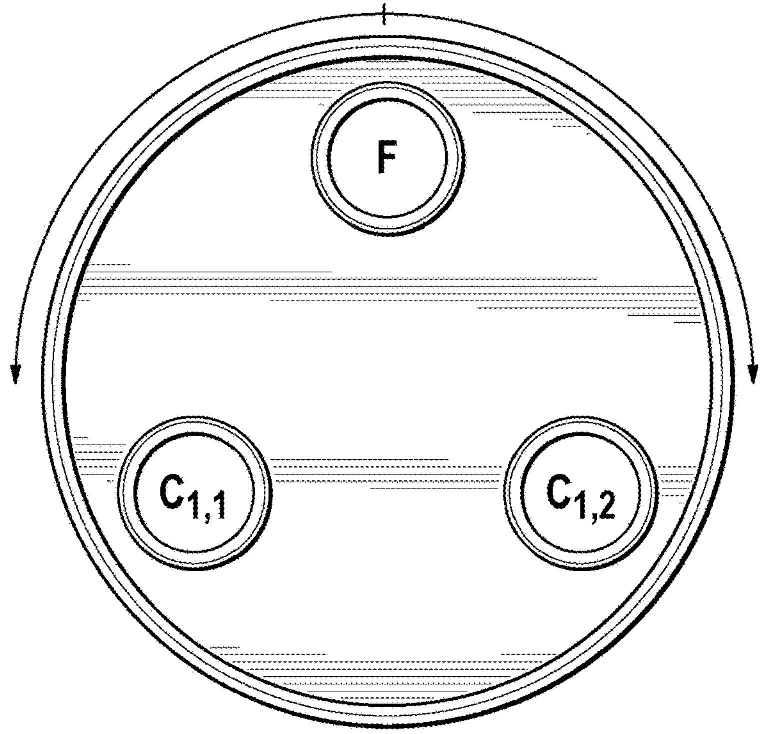
FIG. 9 is another schematic illustration of a diverter valve seat and eductor arrangement in accordance with one embodiment of the invention.

In the embodiments described above, the chemical eductors 144 in the eductor housing 138 were configured to dispense different chemical products (e.g., C1, C2, C3). Aspects of the invention and the configuration of dispenser 100, however, are not so limited. In some applications, such as in janitorial services, it may be desirable to have dispensing operations with the same chemical product but at different flow rates and/or concentrations. Thus, in one embodiment, a first eductor 144 in the eductor housing 138 may be configured to draw a first chemical product C1 into the diluent stream and dispense the chemical solution at a first flow rate (denoted by C1,1) and a second eductor 144 in the eductor housing 138 may be configured to draw the first chemical product C1 into the diluent stream and dispense the chemical solution at a second flow rate (denoted by C1,2). By way of example, C1,1 may designate a high flow rate dispense (e.g., for a mop bucket) and C1,2 may designate a low flow rate dispense (e.g., for a spray bottle). FIG. 9 illustrates the arrangement of the valve seat 132 and eductors 144 to select between a C1,1-F dispensing sequence or a C1,2-F dispensing sequence. In an alternative embodiment, the valve seat 132 may include an additional eductor port 216 corresponding to an ultra-low flow rate C1,3. Accordingly, this aspect further introduces another tier to the arrangement of the valve seat 132 and eductors 144 in the eductor housing 138 as well as to the optimization of various design criteria for dispenser 100.

In the various embodiments of the invention described above, the controller 42 may be configured to determine the position of the valve head 130 relative to the valve seat 132 based on a starting position of the drive gear 254 (as determined by a magnet/Hall effect sensor described in more detail below) and by tracking the amount of rotation of the drive motor 258. To this end, the drive assembly 248 may include a position sensor 259 that provides a signal to the controller 42 indicative of a position of the drive gear 254 (and thus the valve seat 130).

By way of example, in one embodiment the position sensor 259 may include the magnet 255 (e.g., a 2×4 mm Neodymium N42 magnet) and the Hall effect sensor 257. The magnet 255 may be embedded in or otherwise operatively coupled to the drive gear 254. The Hall effect sensor 257 may be mounted to the housing 120 of diverter valve 126 and configured to provide a signal to the controller 42 that varies in dependence on the position of the magnet 255 relative to the Hall effect sensor 257. In an alternative embodiment, the position sensor 259 may include a light source and a light detector positioned so that the drive gear 254 or an encoder wheel is located between the light source and light detector. The drive gear 254 or encoder wheel may include at least one aperture that is aligned with the light source and light detector when the drive gear 254 is in a predetermined angular position, and misaligned when the drive gear 254 is in another angular position. The light emitted by the light source may thereby selectively illuminate the light detector when the aperture is aligned with the position sensor 259 by rotation of the drive gear 254. In either embodiment, the position sensor 259 may provide a signal having one value when the drive gear 254 is in the predetermined or "home" position (e.g., a voltage corresponding to logic level one), and another value when the drive gear 254 is not in the home position (e.g., a voltage corresponding to a logic level zero).

Position feedback from the sensor may be used to confirm the position of the drive gear 254 at intervals during operation, e.g., each time the sensor indicates the drive gear 254 has passed or is in the home position. The controller 42 may also be configured to return the drive gear 254 to the home position at the end of a dispensing operation.

Figure 10:
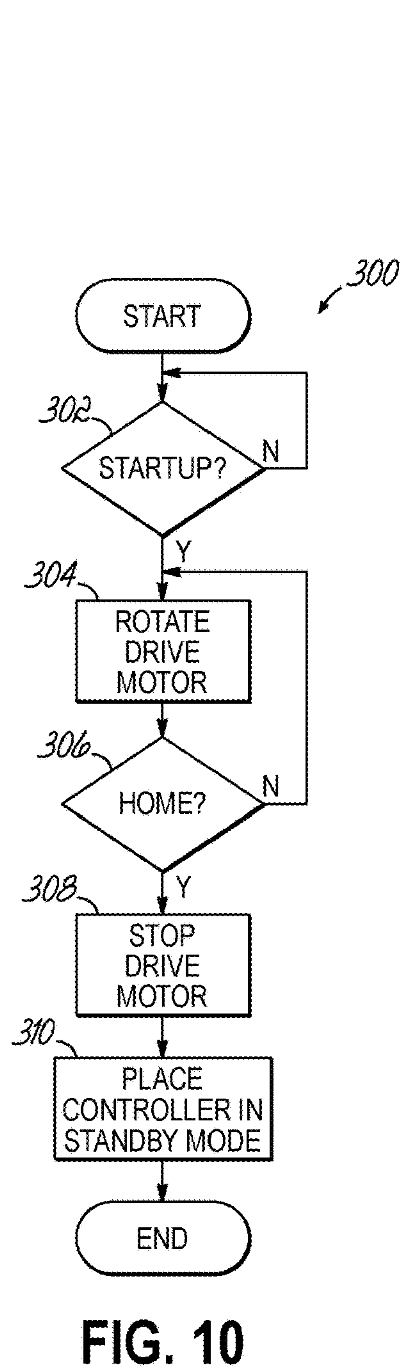
FIG. 10 is a flowchart of a process for calibrating a position of a valve head of the diverter valve of FIG. 5.

FIG. 10 depicts a flowchart illustrating a calibration process 300 that may be implemented by the controller 42 to initialize the drive gear 254 so that it is in the home position at start-up. Process 300 may be executed, for example, each time the controller 42 is powered up, such as after a power outage. In block 302, the process 300 monitors the dispenser 100 for startup. Startup may be indicated, for example, by detecting an application of power to the dispenser 100. If startup is not detected ("NO" branch of decision block 302), the process 300 may continue to monitor for startup. If startup is detected ("YES" branch of decision block 302), the process 300 proceeds to block 304.

In block 304, the process 300 may cause the drive motor 258 to rotate, e.g., by advancing or reversing the drive motor 258 in incremental steps each having a predetermined angular displacement, and proceed to block 306. In block 306, the process 300 monitors the output of the position sensor 259. If the position sensor 259 is not providing a signal indicative of the drive gear 254 being in the home position ("NO" branch of decision block 306), the process 300 may proceed to block 304 and continue rotating the drive gear 258.

If the position sensor 259 is providing a signal indicative of the drive gear 254 being in the home position ("YES" branch of decision block 306), the process 300 may proceed to block 308 and stop the drive motor 258. For embodiments using a magnet-based sensor, process 300 may thereby cause the drive motor 258 to rotate slowly until the magnet is sensed. The process 300 may improve the accuracy of the home position alignment by causing the drive motor 258 to advance by a number of additional steps until the magnet is no longer sensed, and then reverse to a midpoint between the initial and final detection points to ensure accurate alignment to the home position. In an alternative embodiment, the process 300 may cause the drive motor 258 to advance by a number of additional steps known to place the valve head 130 in the home position and stop, thereby avoiding the need to rotate the drive motor 258 in a reverse direction. In any case, once the drive gear 258 is in the home position, the process 300 may proceed to block 310 and place the controller 42 in standby mode.

During dispensing operations, the controller 42 may control the position of the diverter valve 126 based the amount of rotation of the drive motor 258 from the home position. The controller 42 may periodically implement the calibration process 300 to calibrate the position of the drive gear 254, and thus the position of the valve head 130, relative to the position of the drive motor 258. The calibration process 300 may be executed, for example, in response to the controller 42 experiencing a power cycle or brown-out condition.

In response to receiving a signal indicating the drive gear 254 is in the home position, the controller 42 may reset or otherwise note the value of a step counter. The position sensor 259 may thereby provide a feedback loop that allows the controller 42 to calibrate the position of the valve head 130. Once the value of the step counter has been reset or stored in memory as a reference value, the controller 42 may increment the step counter each time the drive motor 258 is rotated by an incremental step in a forward direction (e.g., clockwise), and decrement the step counter each time the drive motor 258 is rotated by the incremental step in a reverse direction (e.g., counter-clockwise). The controller 42 may thereby keep track of the position of the valve head 130 based on the value of the step counter and the fixed relationship between the rotation of the drive motor 258 and the drive gear 254. An exemplary relationship is provided by Equation 1 below:

$$\theta_{VH} = \frac{V_{SC} - V_{REF}}{C} \qquad \text{Eqn. 1}$$

where $\theta_{VH}$ is the angular position of the valve head 130, $V_{SC}$ is the current value of the step counter, $V_{REF}$ is the reference value of the step counter (e.g., zero), and C is a conversion factor defined by the ratio of the worm gear 260 to drive gear 254. Using the position sensor 259 to calibrate the position of the valve head 130 and tracking the position of the drive motor 258 thereby enable the controller 42 to accurately determine the angular position of valve head 130.

In an embodiment of the invention, the drive motor 258 may include a bi-polar stepper motor that makes one revolution for every 200 drive pulses (1.8 degrees per pulse), which may have sufficient torque to be used without a gearbox. In an alternative embodiment, the drive motor 258 may include a more compact stepper motor that makes one revolution for every 20 drive pulses (18 degrees per pulse). In this alternative embodiment, the drive motor 258 may also include a 36:1 step down gearbox between output shaft of the stepper motor and the worm gear 266, thereby producing 0.5 degrees of rotation in the worm gear 266 for each motor drive pulse. The worm gear 266 may have 20 teeth so that five complete rotations of the worm gear 266 rotate the drive gear 254 by 90 degrees. This configuration may be useful for a diverter valve 126 having four equally spaced ports.

Based on the angular position of the valve head 130, the controller 42 may determine which of the plurality of eductors 144 will receive diluent when the input selector valve 114 is in the opened position. Because the type, concentration, and flow rate of the chemical solution being dispensed depends on which eductor 144 is provided with diluent, the controller 42 can determine this information based at least in part on the angular position of the valve head 130. To this end, the controller 42 may include a lookup table or other data structure 70 in memory 64 that associates each of one or more angular positions or ranges of angular positions of the valve head 130 with a respective type, concentration, and flow rate of a chemical solution or diluent that is dispensed when the input selector valve 114 is in the opened position.

The controller 42 may determine a dose of chemical product delivered to the point of use device 46 based on a combination of the angular position of the valve head 130 and an amount of time solution is dispensed while the valve head 130 is in that position. This amount of time may be the amount of time the input selector valve 114 is in the opened position while the valve head 130 is in the angular position, or an amount of time the valve head 130 is in an angular position while the input selector valve 114 is in the opened position. As described in more detail below, the final dilution ratio at the point-of-use device 46 may be reached in stages by dispensing a dose of a chemical product that is later diluted by dispensing additional diluent or another chemical solution.

In an exemplary embodiment, the controller 42 may store data in memory 64 indicative of one or more of the positions of the input selector valve 114 and the valve head 130 with respect to time. The controller 42 may also determine an amount of chemical product, chemical solution, or diluent dispensed to the point-of-use device 46 based on the position data, and store this information in memory 64. This controller 42 may periodically upload this operational data to the database 55. The data stored in the database 55 may enable users to determine when, where, and how much of a chemical product was dispensed each time it was dispensed, what other chemical products were dispensed in the same dispensing operation for a plurality of dispensers 100 in a plurality of locations.

Based on the data in the database 55, users may be able to determine the volume of chemical product dispensed from each chemical source 50, 52. This may allow users to determine if the chemical source 50, 52 is running low, and may also enable users to detect topping off of the chemical source 50, 52. Topping off chemical sources 50, 52 may be undesirable because it can cause issues with using old chemical that has been sitting idle for unknown amounts of time, or may result in accidental mixing of incompatible chemicals.

Embodiments of the invention may provide a compact solution for delivering chemicals into a washing machine by using a dynamic controllable water valve in a laundry environment. The diverter valve 126 may be controlled in a number of ways and can select multiple ports, and can either operate when water is flowing or when shut off. Advantageously, the above described features may enable a compact dispenser 100 that can be mounted within a laundry environment either externally or internally to a washing machine.

By way of an exemplary application of dispenser 100, a simple and easy to set up dispenser may be particularly desirable for coin-operated laundry installations. These laundry installations usually include a plurality of small machines (e.g., 2 to 16 machines each having a capacity of between 7 and 10 kg), so a lower cost dispenser that requires limited maintenance may be preferable. Coin-operated laundries typically only deliver one or two chemicals (e.g., detergent and softener), and use a small number of dispense formulas, often only one. Moreover, the walls within a coin-operated laundry are typically congested with other equipment. A compact dispenser has an advantage over larger systems in this environment because the dispenser can be mounted in a position on the wall, which is more accessible to the installer than a position behind a washing machine where there is limited room. Another benefit of a small footprint is that the chemical delivery line to the washer (along with the chemical pickup lines) may extend vertically downwards from the dispenser, which allows a further reduction in required floor space. The incoming water mains can then be configured to enter the dispenser vertically either from the top or bottom depending on the site. This would reduce any stresses on the unit caused by right angled hose connections creating a torque moment on the manifold.

In another laundry application, the dispenser 100 may be provided as an original equipment manufacturer component that is mounted onboard a washing machine. A dispenser that is small enough to be installed either inside or on the rear of the machine may be attractive to original equipment manufacturers who want to provide a dispensing solution to customers. The dispenser could either be built into the machines during manufacture, or installed on-site in the form of an add-on module.

Applications of embodiments of the invention are not limited to washing machines. For example, facility management scenarios often require chemical solutions be dispensed into a bucket, a large container, or a machine such as a scrubber/dryer floor cleaning machine. A typical problem in facility management is low water pressure, which generates difficulties in maintaining accurate dilution, particularly at lean dilution ratios. Embodiments of the invention address this problem by configuring the dispenser 100 to inject chemical product through an eductor that operates for a set period in order to deliver the chemical so that no tip is required. Once the correct dose of chemical product has been delivered at a relatively high concentration level (e.g., 2.5:1-4:1), the dispenser 100 may be configured to top up the container with diluent to achieve the proper final dilution ratio. Advantageously, the chemical is delivered pre-diluted which then allows further mixing with diluent, which is more efficient than mixing diluent with straight chemical product to achieve the final dilution ratio. Another advantage is that small quantities of chemical can be injected accurately without the need for very small tips, which have a tendency to clog.

In an alternative embodiment of the invention, and to enable a specified volume of liquid to be delivered, the dispenser 100 may include a single flow meter operatively coupled to the system on the pressure side of the input selector valve 114. Additional options may include controlling the amount and type of delivery the chemical product and diluent in order to create the best effect, e.g., diluent first, chemical product first, or a mixture of chemical product and diluent injections.

One or more of the eductors 144 used for chemical product injection may be an ultra-low flow-rate (ULF) eductor. This type of eductor may be advantageous in certain situations as it would not be as susceptible to poor operation due to low pressure operation, e.g., at diluent pressures of around 1 bar. When using the ULF eductor, the dispenser 100 may top-up the container or point-of-use device with diluent dependent on the flow conditions.

There are also industrial applications where large containers of diluted chemical are maintained in order to supply systems and processes with ready to use chemical. One particular application is providing automated cutting machines with a reservoir of chemical solution that provides a ready-to-use cutting fluid. From the moment this reservoir is initially filled, the chemical solution may begin to deteriorate due to evaporation of the diluent from the reservoir. Another mechanism for deterioration of the cutting fluid may be evaporation of the diluent due to heating of cutting fluid being sprayed around the cutting environment. Evaporation of diluent from the cutting fluid may cause the chemical solution to become more concentrated and viscous, resulting in the cutting fluid becoming less effective. Embodiments of the invention that include conductivity or inductive sensor(s) in the reservoir may allow the controller 42 to operate as a closed loop system to fill, dilute, monitor and top-up the reservoir with the correct amount of diluent or chemical product.

Laundry applications typically require that delivery of chemical solutions be accurate, repeatable and short. Short dispensing operations (e.g., below 2-3 seconds) can affect accuracy, so dispensing operation times are typically maintained above a minimum value (e.g., on the order of 5 seconds for small volumes of chemical). The amount of chemical product that is delivered to the point-of-use devices is also typically based on time because once the controller 42 receives a signal from the machine interface 72 indicating a wash cycle has begun, the machine starts to fill with water. Thus, any chemical dispensing operation for that cycle needs to happen before the machine fill has completed.

Figure 11:
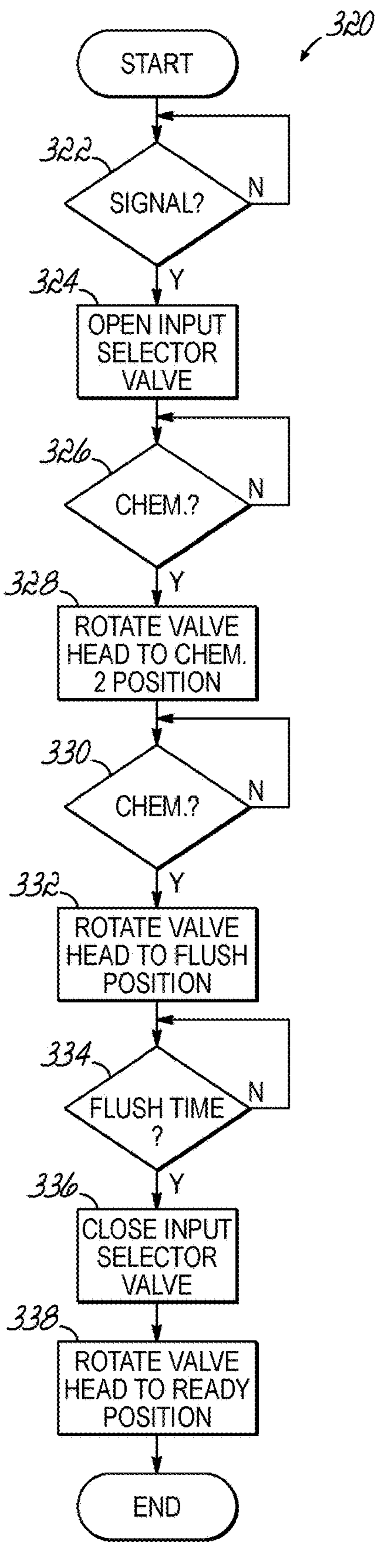
FIG. 11 is a flowchart of a process for implementing a dispensing operation in accordance with an embodiment of the invention.

FIG. 11 depicts a process 320 that may be implemented by the controller 42 to perform a dispensing operation to a washing machine. In block 322, the process 320 may determine if a signal has been received indicating the washing machine is starting a cycle. If the signal has not been received ("NO" branch of decision block 322), the process 320 may continue to monitor the output of the machine interface 72. If the signal is received ("YES" branch of decision block 322), the process 320 may proceed to block 324, open the input selector valve 114, start a dispense timer, and proceed to block 326. Opening the input selector valve 114 may cause diluent to flow through the dispenser 100 and draw a chemical product C1 into the eductor 144 to which the valve head 130 is diverting the diluent.

In block 326, the process 320 may determine if the dispense timer has reached the allotted time for dispensing chemical product C1. If the allotted time has not been reached ("NO" branch of decision block 326), the process 320 may continue monitoring the dispense timer. If the allotted time has been reached ("YES" branch of decision block 326), the process 320 may proceed to block 328, rotate the valve head 130 to chemical product C2 position, restart the dispense timer, and proceed to block 330. Rotating the valve head 130 to the chemical product C2 position may cause the diluent to be diverted to the eductor 144 operatively coupled to the source of chemical product C2 so that chemical product C2 is drawn into the eductor 144.

In block 330, the process 320 may determine if the dispense timer has reached the allotted time for dispensing chemical product C2. If the allotted time has not been reached ("NO" branch of decision block 330), the process 320 may continue monitoring the dispense timer. If the allotted time has been reached ("YES" branch of decision block 330), the process 320 may proceed to block 332, rotate the valve head 130 to the flush F position, restart the dispense timer, and proceed to block 334. Rotating the valve head 130 to the flush F position may cause the diluent to be diverted to the eductor 144 which is not coupled to a chemical product so that the dispenser 100 dispenses unmixed diluent.

In block 334, the process 320 may determine if the dispense timer has reached the allotted time for the flush operation. If the allotted time has not been reached ("NO" branch of decision block 334), the process 320 may continue monitoring the dispense timer. If the allotted time has been reached ("YES" branch of decision block 334), the process 320 may proceed to block 336, close the input selector valve 114, proceed to block 338, and rotate the valve head 130 to a ready position (e.g., the home position). Process 320 thereby implements a dispensing operation that dispenses chemical product C1 followed by chemical product C2 and ending with a flush stage F that is terminated by shutting off the input selector valve 114.

Under some conditions, the process 320 may not place the valve head 130 in the home position at the end of a dispensing operation. This situation may occur when there is a benefit to placing the valve head 130 in another starting position in preparation for the next expected signal or dispending operation. Continuing with the above example, if a subsequent dispensing operation dispenses a chemical product C3, the process 320 may rotate the drive gear 254 so that the rotatable valve head 130 is in position to dispense chemical product C3 when the input selector valve 114 is reopened.

Figure 12:
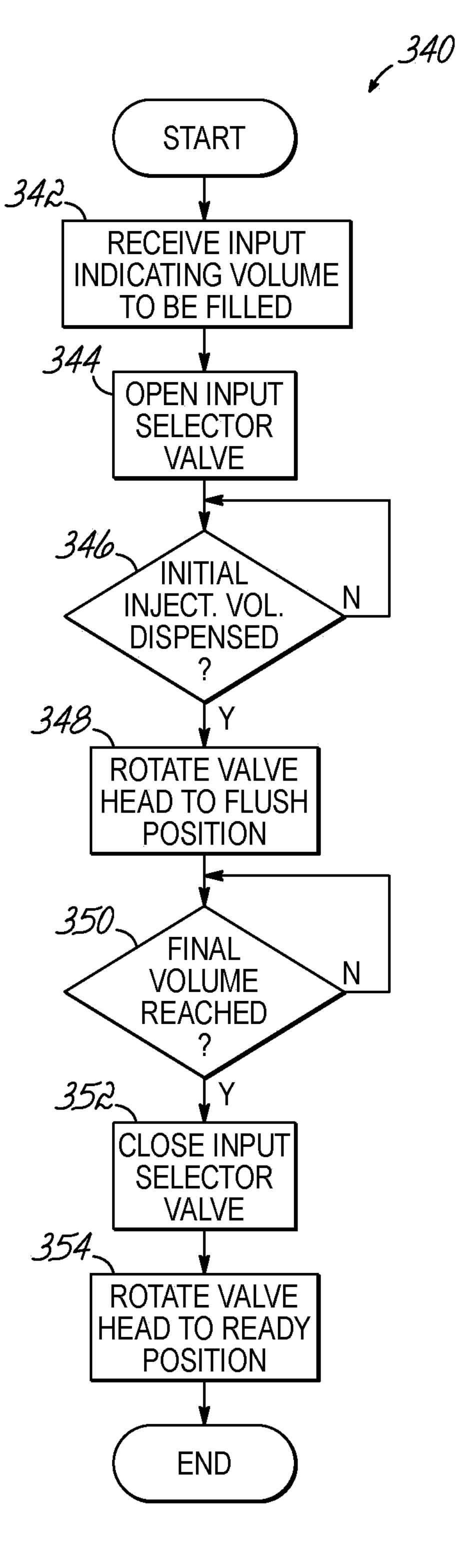
FIG. 12 is a flowchart of a process for filling a container with a chemical solution in accordance with an embodiment of the invention.

Embodiments of the invention that are used primarily for filling large containers may include a flow meter between the diluent source 80 and diverter valve 126. FIG. 12 depicts a flowchart illustrating a process 340 that may be implemented by the controller 42 to fill a large container with chemical solution for a dispensing system 40 that includes the flow meter.

In block 342, the process 340 may receive input from a user indicating a volume of the container to be filled. This input may be received, for example, through a user interface of the controller 42. In response to receiving the input, the process 340 may proceed to block 344 and open the input sector valve 114. As a result, the dispenser 100 may begin dispensing a chemical solution corresponding to the eductor 144 that receives diluent when the rotatable valve head 130 is in the ready position. By way of example, the selected eductor 144 may be configured to dispense a chemical solution having a relatively high dilution ratio, e.g., between approx. 2.5:1 and 4:1.

In block 346, the process 340 may monitor the flow meter to determine if an initial injection volume has been dispensed. The initial injection volume may be calculated to provide a dose of chemical product consistent with the volume of the container and a final dilution ratio of the chemical solution. If the volume of solution dispensed has not reached the initial injection volume ("NO" branch of decision block 346), the process 340 may continue with the initial injection dispense operation.

If the volume of the solution has reached the initial injection volume ("YES" branch of decision block 346), the process 340 may proceed to block 348, rotate the valve head 130 to the flush F position, and proceed to block 350. Rotating the valve head 130 to the flush F position may cause the dispenser 100 to dispense unmixed diluent as described above.

In block 350, the process 340 may monitor the flow meter to determine if the total amount of solution dispensed has reached the final volume, e.g., the volume of the container entered by the user. If the final volume has not been reached ("NO" branch of decision block 350), the process 340 may continue dispensing diluent. If the final volume has been reached ("YES" branch of decision block 350), the process 340 may proceed to block 352, close the input selector valve 114, proceed to block 354, and rotate the valve head 130 to a ready position so that the dispenser 100 is ready to perform another container fill operation.

By injecting the chemical product in an initial injection operation, the process 340 may avoid the need to use fine tips in the eductor 144 by controlling the volume of chemical product injected over a shorter time than the total fill. In large container filling operations, the amount of time that chemical product is delivered may be calculated based on the volume of water passing through the assembly rather than an amount of time. Using a multiple port diverter valve may provide the option of programming multiple chemical product injection and diluent fill operations in order to improve mixing. That is, one or more sources of the chemical product may be coupled to more than one eductor so that alternating chemical injection and diluent fill stages can be implemented sequentially.

While the diverter valve 120 described above was configured as a rotary-type of valve, aspects of the invention are not so limited and other configurations of the diverter valve may be possible and remain within the scope of the present invention. By way of example, in an alternative embodiment, the diverter valve 364 may configured as an in-line or linear type of valve. In this embodiment, the diverter valve 364 may include a generally rectangular valve head 366 and a generally rectangular valve seat 368. The valve head 366 includes a plate-like body 370 having an upper surface 372, a lower surface 374, and an outer peripheral sidewall 376 extending therebetween. The body 370 of the valve head 366 should be formed from a durable material with low friction properties. By way of example, the valve head 366 may be formed from nylon, polytetrafluoroethylene (PTFE), or some other suitable synthetic polymer. Additionally, the lower surface 374 of the body 370 may be polished to a fine smoothness to further reduce friction.

To allow diluent to pass through the diverter valve 364, the valve head 366 includes at least one generally circular diluent port 378 extending through the body 370 between the upper and lower surfaces 372, 374 thereof. In accordance with one aspect of the invention, and as will be discussed in more detail below, the valve head 366 may include pressure relief features that are configured to reduce or equalize the pressure drop across the valve head 366 during use. This will allow, for example, the valve head 366 to move relative to the stationary valve seat 368 with reduced forces and friction. In any event, in an exemplary embodiment, the pressure relief features may include one or more inner pressure relief ports 380 and one or more outer pressure relief ports 382 adjacent the peripheral sidewall 376.

Figure 13:
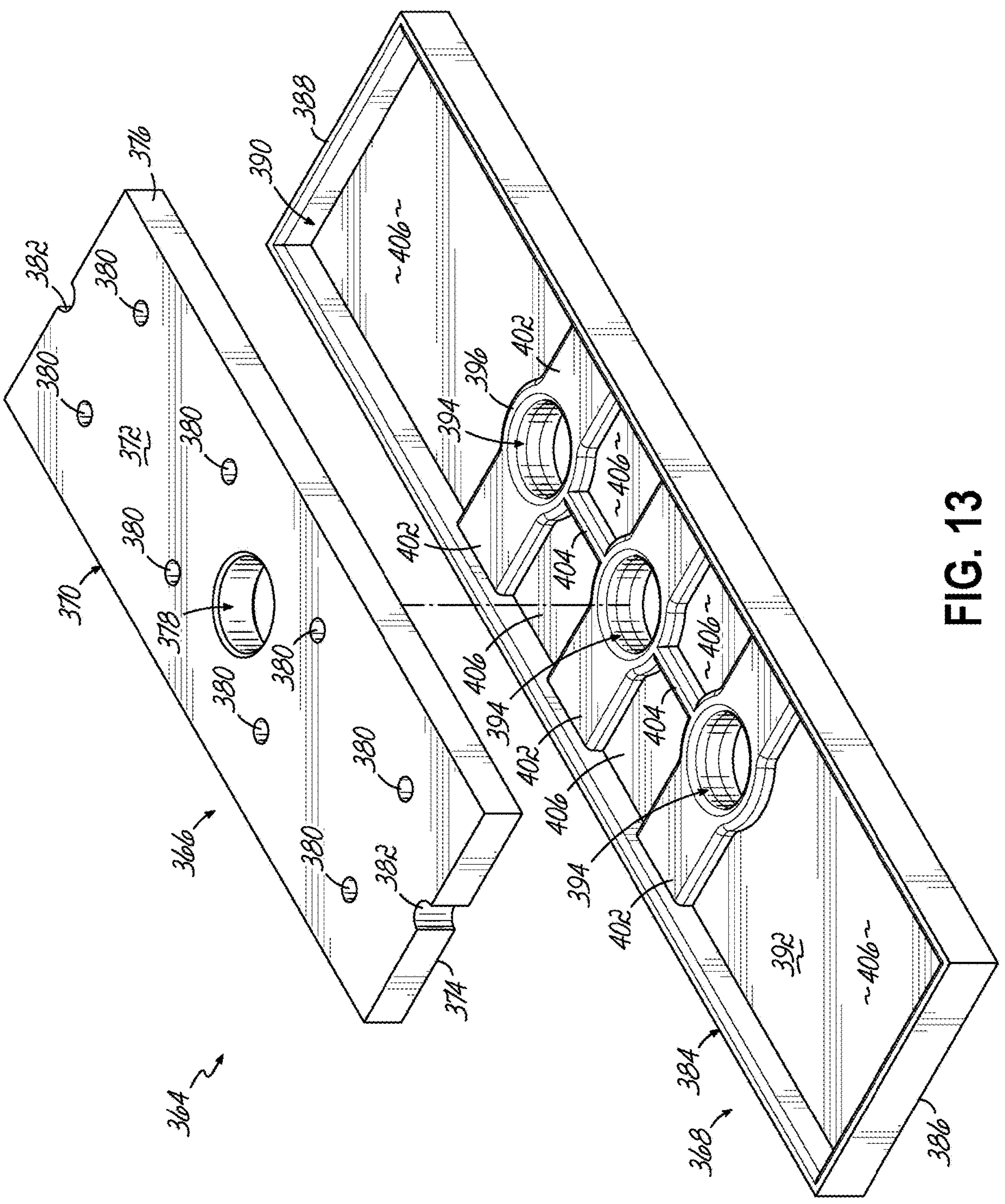
FIG. 13 is a disassembled perspective view of a diverter valve in accordance with another embodiment of the invention.
Figure 13A:
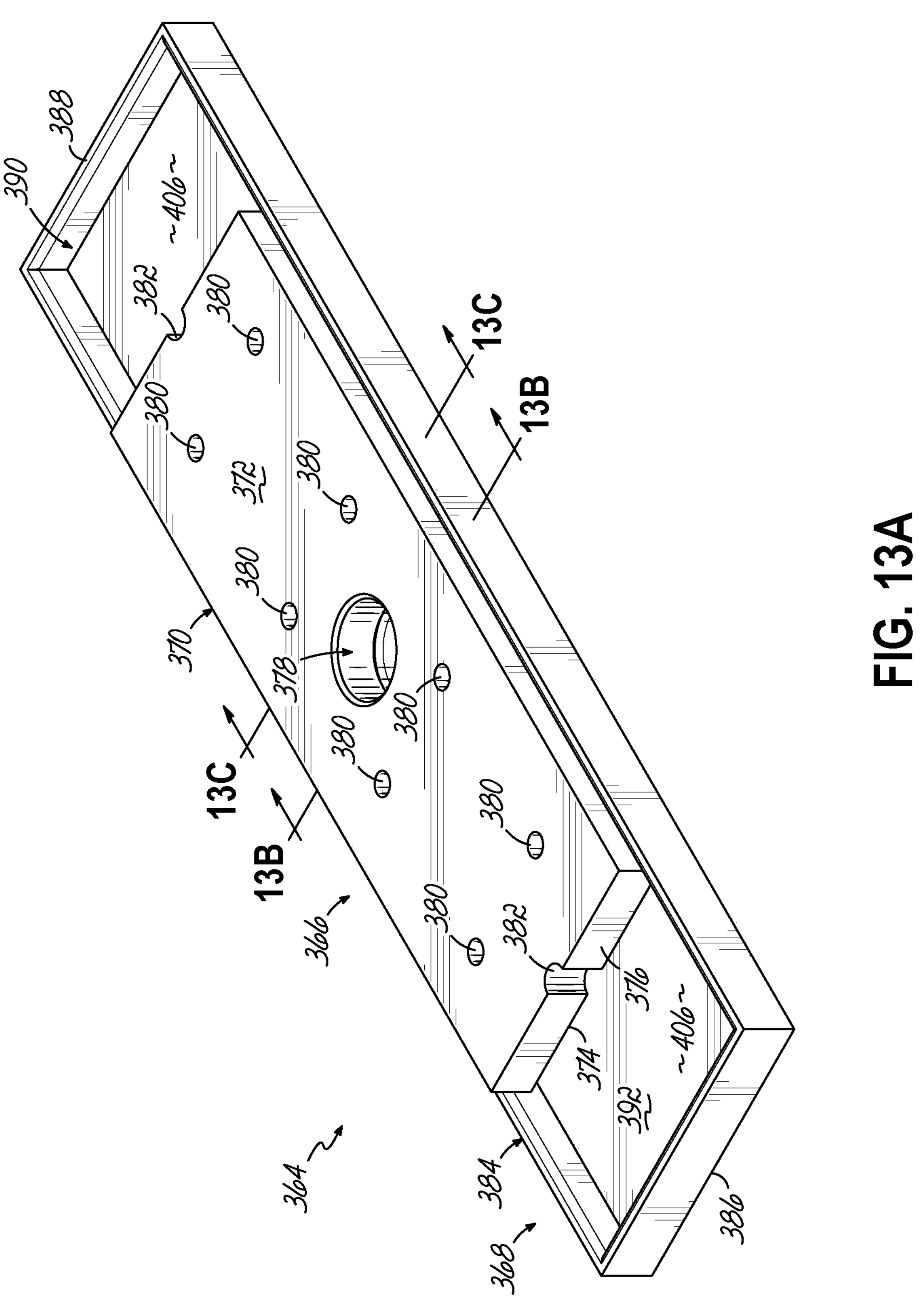
FIG. 13A is an assembled perspective view of the diverter valve shown in FIG. 13.
Figure 13B:
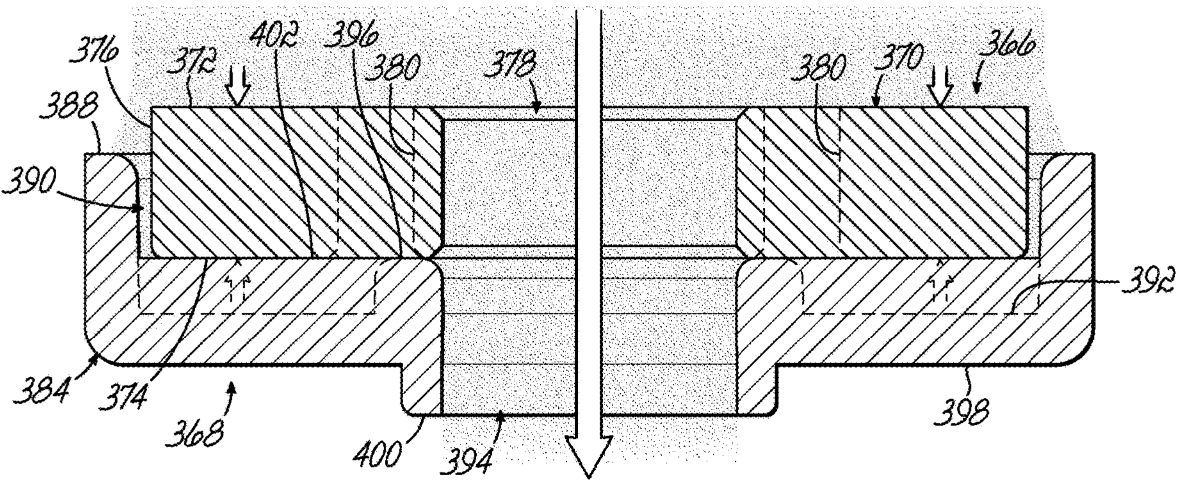
FIG. 13B is a cross-sectional view of the diverter valve shown in FIG. 13A generally taken along line 13B-13B.
Figure 13C:
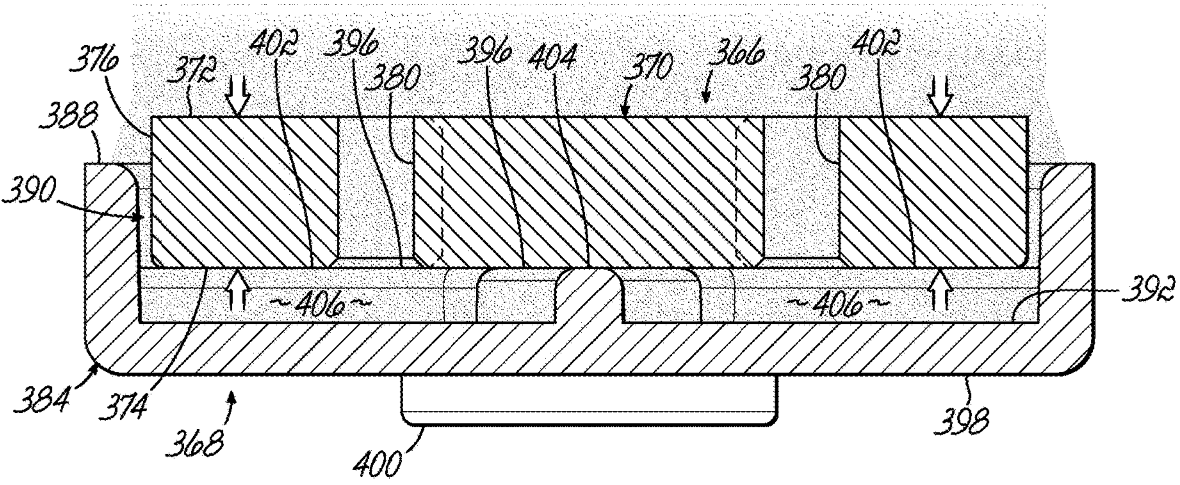
FIG. 13C is another cross-sectional view of the diverter valve shown in FIG. 13A generally taken along line 13C-13C.

The valve seat 368 includes a body 384 having a lower wall 386 and a peripheral flange 388 extending upwardly from the lower wall 386 to define a cavity 390 configured to receive the valve head 366 therein (FIG. 13A). In an exemplary embodiment, the inner surface 392 of the lower wall 386 includes a plurality of generally circular eductor ports 394 spaced along the valve seat 368 and extending through the lower wall 386 of the valve seat 368. Each of the eductor ports 394 may be defined by a raised seal 396 extending upwardly from the inner surface 392 of the lower wall 386, but at a height less than the peripheral flange 388. The raised seals 396 that define the eductor ports 394 are configured to be low friction and abrasion resistant to facilitate movement of the valve head 366 relative to the valve seat 368. For example, the raised seals 396 may be formed from polyethylene, polytetrafluoroethylene, or suitable polymeric, seal-type materials with low-friction and low-weak properties. In a specific embodiment of the invention, the valve seat 368 is made of PTFE and the raised seals 396 are made of polypropylene. Additionally, the outer surface 398 of the lower wall 386 may include a raised rib or seal 400 disposed about the eductor ports 394 and extending from the outer surface 398. Similar to the above, the eductor ports 394 are configured to be generally aligned with and in fluid communication with respective eductors in the eductor housing such that diluent that flows through one of the eductor ports 394 in the valve seat 368 then flows through a respective eductor in the educator housing.

In one embodiment, the valve seat 368 may include various strengthening or stiffening features to support the valve seat 368 and/or the raised seals 396 of the eductor ports 394. For example, and as illustrated in FIG. 13, the eductor ports 394 may be disposed between the peripheral walls 384 and a stiffening tab 402 may extend between the eductor ports 394 and the peripheral walls 384. Additionally, stiffening ribs 404 may extend between adjacent eductor ports 394 at a location midway between of the peripheral walls 384. The stiffening tabs 402 and the stiffening ribs 404 may be formed from the same material as the raised seals 396. Such an arrangement of the eductor ports 394 and stiffening ribs 404 provides interstitial regions 406. Similar to the above, the pressure relief ports 380, 382 are configured to communicate with the interstitial regions 406 to reduce of equalize pressure across the valve head 366.

FIG. 13A illustrates the diverter valve 364 assembled together with the valve head 366 positioned within the cavity 390 of the valve seat 368. When so assembled, the lower surface 374 of the valve head 366 engages the raised seals 396, stiffening tabs 402 and stiffening ribs 404 on the inner surface 392 of the valve seat 366 in a fluid-tight seal.

Similar to the above, the valve head 366 is configured to be movable relative to the valve seat 368, such as along a generally linear direction, so that the diluent port 378 in the valve head 368 may be placed in communication with each of the educator ports 394 in the valve seat 368. In one aspect of the invention, the valve head 366 may be operatively coupled to a drive assembly (not shown) for moving the valve head 366 along a longitudinal axis in at least one linear direction. In an exemplary embodiment, the drive assembly may be configured to move the valve head 366 back and forth along the longitudinal axis. Operation of the diverter valve 364 within a chemical dispenser is similar to that described above and for sake of brevity, a further description will not be provided herein.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A diverter valve comprising:

a valve head having a diluent port and one or more pressure relief ports configured to equalize diluent pressure across the valve head;

a valve seat having a plurality of ports, each port of the plurality of ports configured to be in fluid communication with a respective one of a plurality of eductors; and a drive mechanism configured to move the valve head relative to the valve seat so that diluent may flow through each of the plurality of ports when the diluent port of the valve seat is in communication with the port of the plurality of ports.

2. The diverter valve of claim 1, wherein the diverter valve is configured as a rotary diverter valve wherein the valve head rotates about an axis relative to the valve seat.

3. The diverter valve of claim 1, wherein the valve seat includes an inner interstitial region and one or more outer interstitial regions defined by one or more stiffening ribs.

4. The diverter valve of claim 3, wherein the valve head includes one or more inner pressure relief ports arranged to be in fluidic communication with the inner interstitial region and one or more outer pressure relief ports arranged to be in fluidic communication with the one or more outer interstitial region.

5. The diverter valve of claim 1, wherein the valve seat includes one or more stiffening tabs and one or more stiffening ribs.

6. The diverter valve of claim 1, wherein the drive mechanism includes a drive motor.

7. The diverter valve of claim 1, further comprising:

a controller coupled to the drive mechanism and configured to control movement of the valve head relative to the valve seat.

8. The diverter valve of claim 7, wherein the controller comprises at least one processor and memory storing instructions that, when executed, cause the at least one processor to perform operations comprising:

moving the valve head relative to the valve seat.

9. The diverter valve of claim 1 wherein the drive mechanism comprises:

a drive motor for rotating a drive shaft;

a worm gear coupled to the drive shaft; and a drive gear that meshes with teeth of the worm gear, the drive gear configured to rotate the valve head.

10. A chemical dispensing system comprising:

the diverter valve of claim 1;

a plurality of eductors fluidically coupled to the plurality of ports;

an outlet manifold in fluidic communication with respective outlets of each of the plurality of eductors;

a controller operatively coupled to the drive mechanism;

one or more chemical reservoirs operatively coupled to respective ones of the plurality of eductors; and a point-of-use device coupled in fluidic communication with the outlet manifold, and wherein the point-of-use device is in electrical communication with the controller and the controller is configured to operate the drive mechanism responsive to input received from the point-of-use device.

11. The chemical dispensing system of claim 10, wherein the plurality of eductors includes at least one chemical eductor that includes a pickup port and the plurality of eductors includes at least one flush eductor that does not have a pickup port.

12. The chemical dispensing system of claim 11, further comprising an input selector valve fluidically coupled to the diverter valve comprising a solenoid for moving the input selector valve between an opened position and a closed position.

13. A chemical dispenser comprising:

a diverter valve comprising:

a valve head comprising a diluent port and at least one pressure relief port configured to equalize diluent pressure across the valve head;

a valve seat having a plurality of ports, each port of the plurality of ports configured to be in communication with a respective one of a plurality of eductors; and a drive mechanism configured to drive the valve head relative to the valve seat to alternately align the diluent port with one of the plurality of ports.

14. The chemical dispenser of claim 13, wherein the valve seat includes an inner interstitial region and one or more outer interstitial regions defined by one or more stiffening ribs.

15. The chemical dispenser of claim 13, wherein the valve seat includes one or more stiffening tabs and one or more stiffening ribs.

16. The chemical dispenser of claim 14, wherein the valve head includes one or more inner pressure relief ports arranged to be in fluidic communication with the inner interstitial region and one or more outer pressure relief ports arranged to be in fluidic communication with one or more outer interstitial region.

17. A chemical dispensing system comprising:

the chemical dispenser of claim 13;

an inlet comprising an input selector valve in fluidic communication with the diverter valve;

an outlet manifold in fluidic communication with respective outlets of each of the plurality of ports, and a controller operatively coupled to the drive mechanism;

a diluent source coupled to the inlet of the chemical dispenser; and a point-of-use device coupled in fluidic communication with the outlet manifold, and wherein the point-of-use device is in electrical communication with the controller and the controller is configured to operate the drive mechanism responsive to input received from the point-of-use device.

18. A chemical dispenser comprising:

a diverter valve comprising:

a valve head comprising a diluent port and at least one means for equalizing diluent pressure across the valve head;

a valve seat having a plurality of ports, each port of the plurality of ports configured to be in communication with a respective one of a plurality of eductors; and driving means for moving the valve head relative to the valve seat to alternately align the diluent port with one of the plurality of ports.

19. The chemical dispenser of claim 18, further comprising an input selector valve fluidically coupled to the diverter valve, the input selector valve having opened and closed positions and configured to be coupled to a diluent source.

20. The chemical dispenser of claim 19, further comprising means for moving the input selector valve between the opened and closed positions.

* * * * *